United States Patent [19]

Whitlow et al.

[11] 4,210,961

[45] Jul. 1, 1980

[54] SORTING SYSTEM

[75] Inventors: Duane L. Whitlow, Hillsdale, N.J.; Azra Sasson, New York, N.Y.

[73] Assignee: Whitlow Computer Services, Inc., Englewood Cliffs, N.J.

[21] Appl. No.: 943,695

[22] Filed: Sep. 19, 1978

Related U.S. Application Data

[63] Continuation of Ser. No. 501,874, Aug. 30, 1974, which is a continuation of Ser. No. 187,689, Oct. 8, 1971.

[51] Int. Cl.$^2$ .............................................. G06F 9/16
[52] U.S. Cl. ..................................................... 364/300
[58] Field of Search ................ 364/200 MS File, 300, 364/900 MS File

[56] References Cited

U.S. PATENT DOCUMENTS

| | | | |
|---|---|---|---|
| 2,961,643 | 11/1960 | Ayres et al. | 364/900 |
| 3,032,746 | 5/1962 | Kautz | 364/900 |
| 3,380,029 | 4/1968 | Goetz | 364/300 |
| 3,399,383 | 8/1968 | Armstrong | 364/900 |
| 3,428,946 | 2/1969 | Batcher | 364/900 |
| 3,439,340 | 4/1969 | Gallaher | 364/900 |
| 3,444,523 | 5/1969 | Dirks | 364/900 |
| 3,548,381 | 12/1970 | Dirks | 364/900 |
| 3,587,057 | 6/1971 | Armstrong | 364/900 |
| 3,587,062 | 6/1971 | Jen | 365/73 |
| 3,611,316 | 10/1971 | Woodrum | 364/300 |
| 3,636,519 | 1/1972 | Heath | 364/900 |
| 3,696,343 | 10/1972 | Schloss | 364/900 |

OTHER PUBLICATIONS

Goetz, M., "Sorting and Merging", *Digital Computer User's Handbook* 1967, pp. 1-292-1-320.
Goetz, M., "Some Improvements in the Technology of String Merging and Internal Sorting", *1964, Spring Joint Computer Conference,* vol. 25, pp. 599-607.
Bender, G. et al., "Function and Design of DOS/360 and TOS/360," *IBM Systems Journal,* vol. 6, No. 1, pp. 2-21.
Letty, W., "Sorting" *Proceedings of the Third Australian Computer Conference,* 1967, pp. 474-480.
Dinsmore, R., "Longer Strings from Sorting", Communications of the ACM, vol. 8, Issue 1, Jan. 1965, p. 48.
Lorin, H., "A Guided Bibliography to Sorting", *IBM Systems Journal,* vol. 10, No. 3, pp. 244-256, 1971.
Knuth, D., "The History of Sorting", *Datamation,* Dec. 1972, pp. 64-70.

*Primary Examiner*—Raulfe B. Zache
*Attorney, Agent, or Firm*—Morton C. Jacobs

[57] ABSTRACT

A method is disclosed of sorting data in an electronic data processing system utilizing a digital computer and at least one random access device such as, for example, a magnetic disc or drum unit. A first simulation is performed to optimize the utilization of the resources of the data processing system. This simulation is based on information relating to characteristics of the data processing system available to the sorting function as well as known or predicted information concerning the data to be sorted. The input data is ordered into a plurality of strings of data which are generated by a selection technique known as quadratic selection replacement. The number of strings generated is minimized by determining if data bias exists, and if unfavorable or negative bias is discovered, the order of string generation is reversed. The ordered strings of data are written into random access storage in sets of ordered data blocks with each block having at least one link each to the data blocks logically positioned in front and in back thereof so that the logical position of each block in the string is well defined. After the initial string generation phase has been completed, the sequence in which the now existing strings will be selected for merging into fewer strings is computed so that the data in the strings will be manipulated a minimum number of times. The data blocks of the merged strings are then read into the working storage area of the digital computer where the data blocks are merged into still fewer strings. The working storage area is divided into a record hold area and generally, at least three buffers, an input buffer, an output buffer, and an active buffer from which the data is transferred into and from the record hold area. The order in which the data blocks already in the working storage area will become exhausted is maintained and hence the order in which new data blocks will be required is anticipated before they are needed. Thus, the read-write heads (hereinafter referred to as readheads) in the random access storage devices can be positioned at the proper track location for reading a required block before the block is needed. This is one result of the synchronization of read and write operations which thereby reduces the input/output time. This merge process is repeated until the number of strings has been reduced to a number equal to the order of the final merge. That number of strings is then read from the random access storage area into the working storage area of the computer and again merged until only one string or set of strings remains which string or set of strings contains the input data ordered in the desired sequence.

35 Claims, 14 Drawing Figures

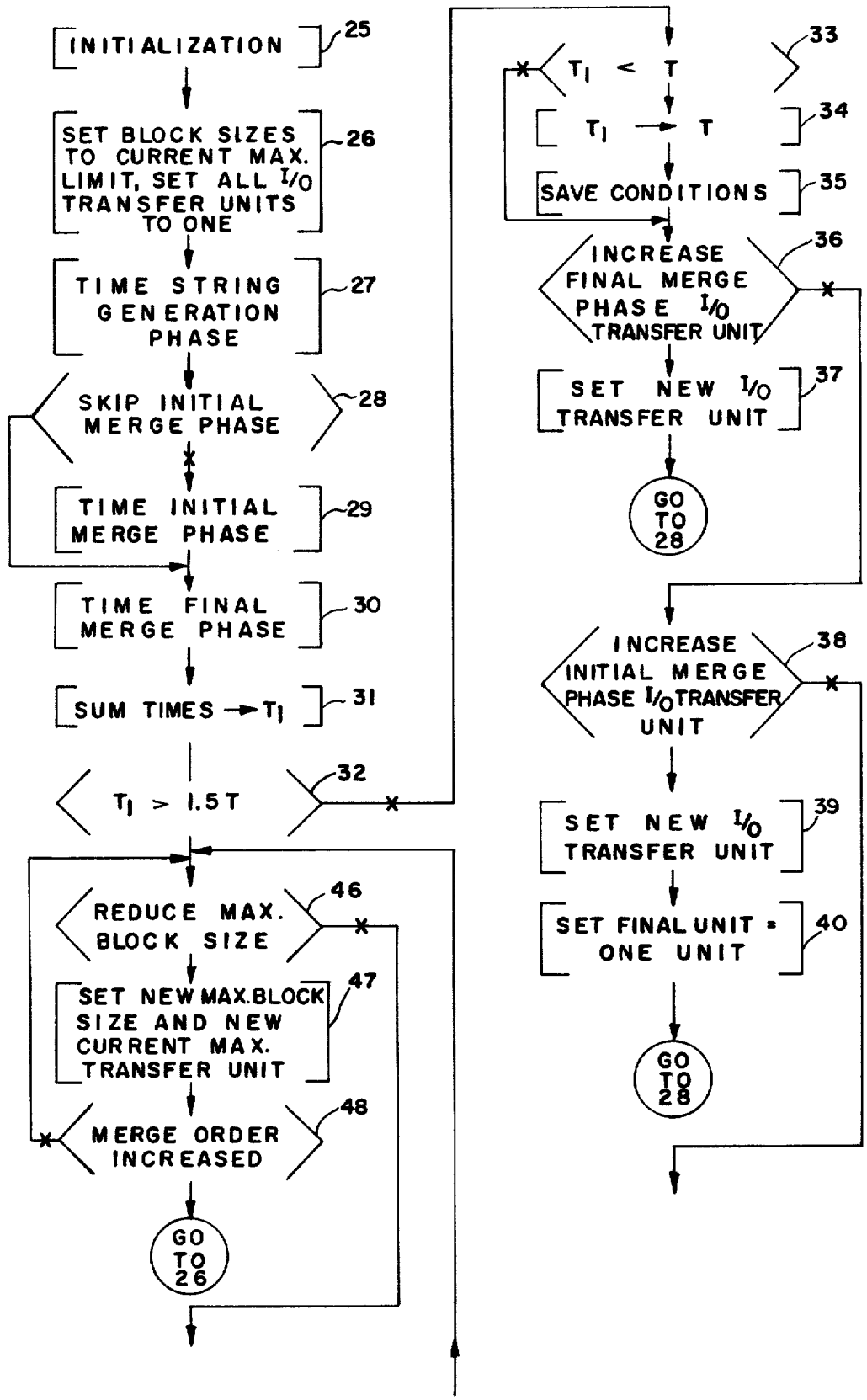
FIG. 4A. PRE-STRING GENERATION PHASE

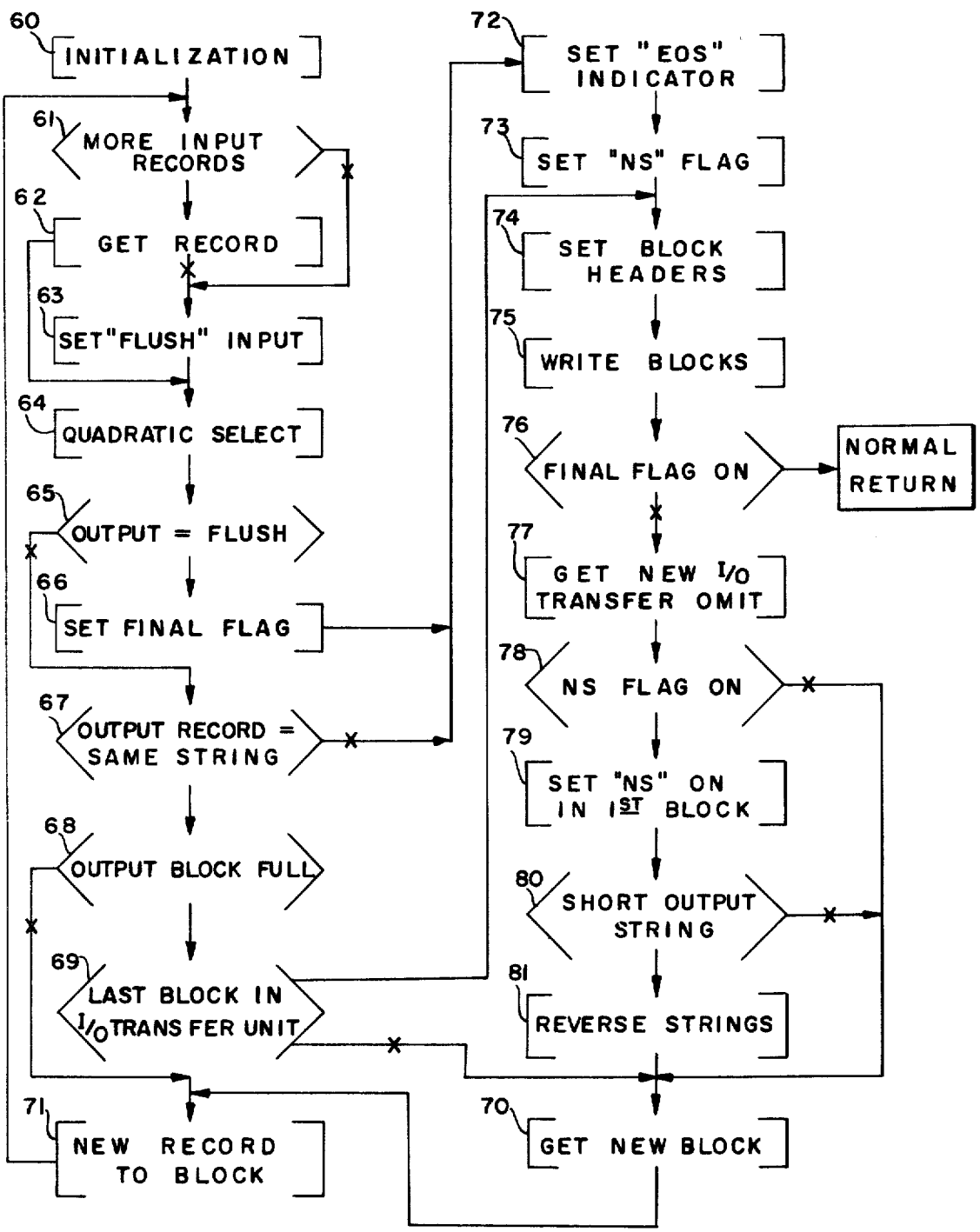
FIG. 5. STRING GENERATION

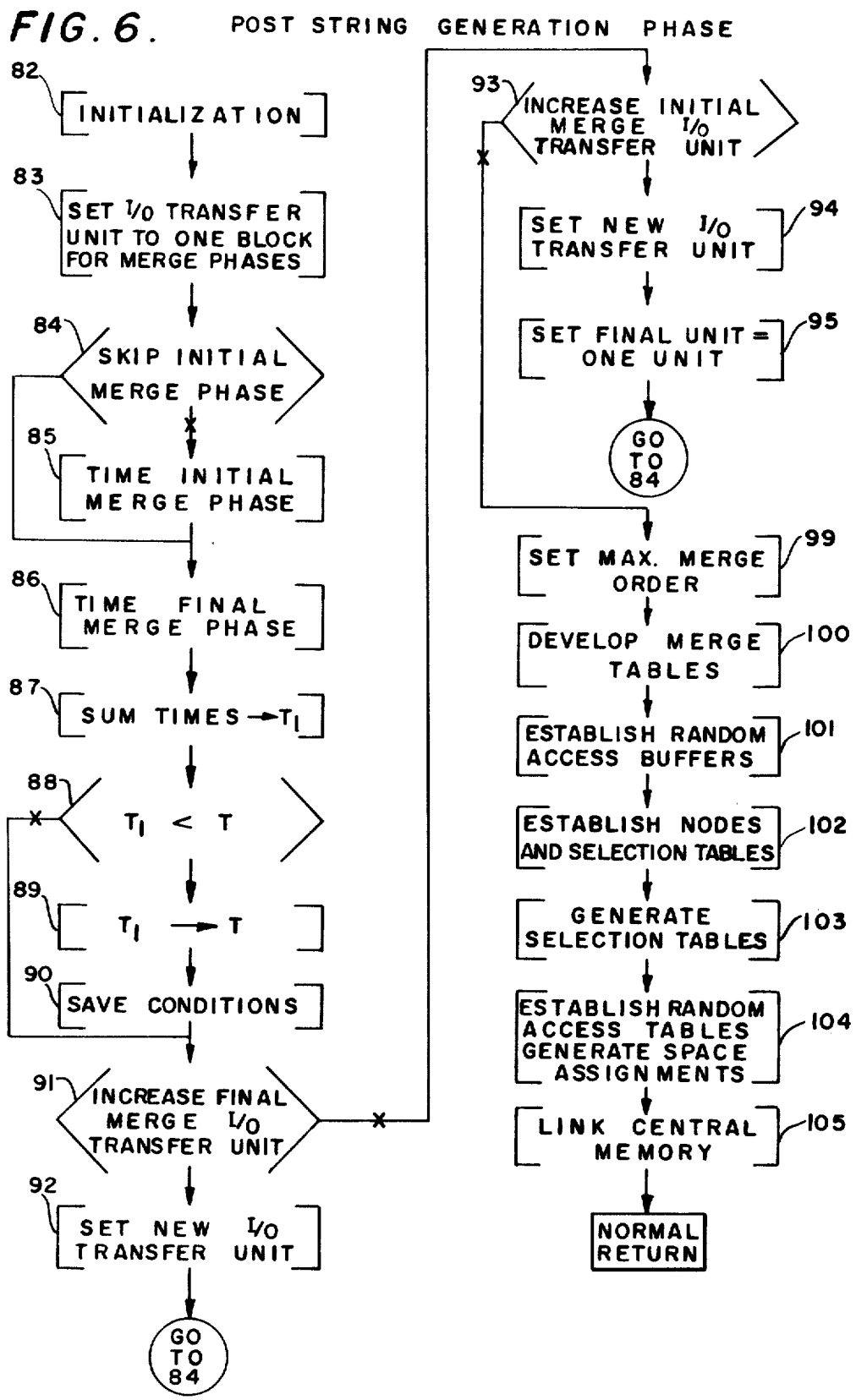

FIG.7.
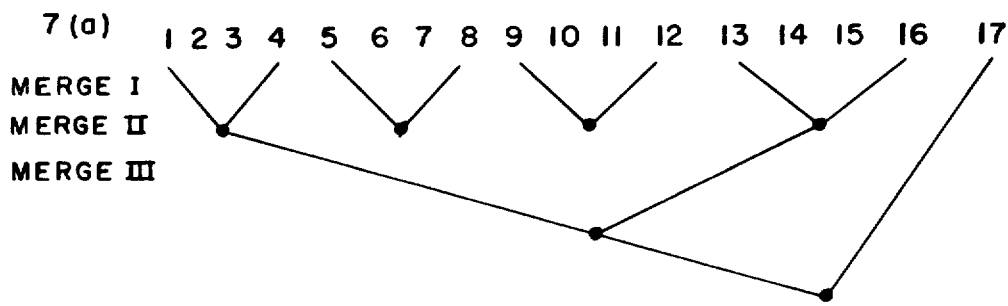
7(a)
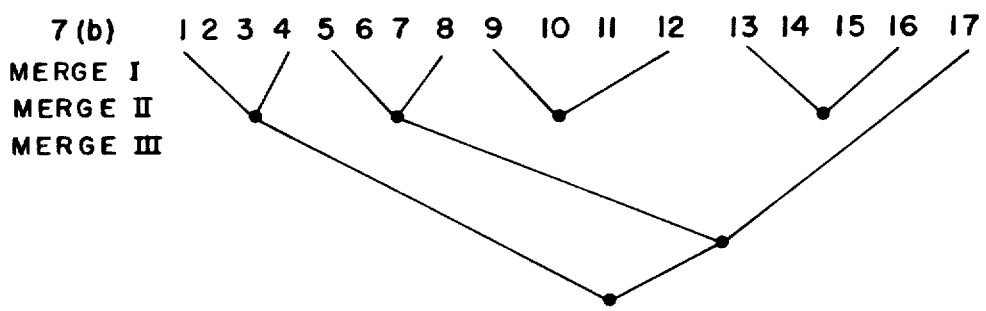
7(b)
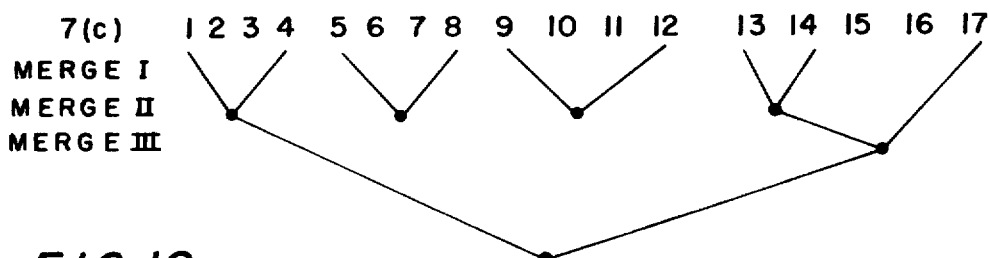
7(c)
FIG.10.
BLOCKS IN RECORD HOLD AREA
| STRING | BLOCK | RECORD KEY VALUES |
|---|---|---|
| I | I | 18  22  38  40 |
| I | II | 41  43  46  49 |
| II | I | 12  19  36  60 |
| III | I | 37  39  43  47 |

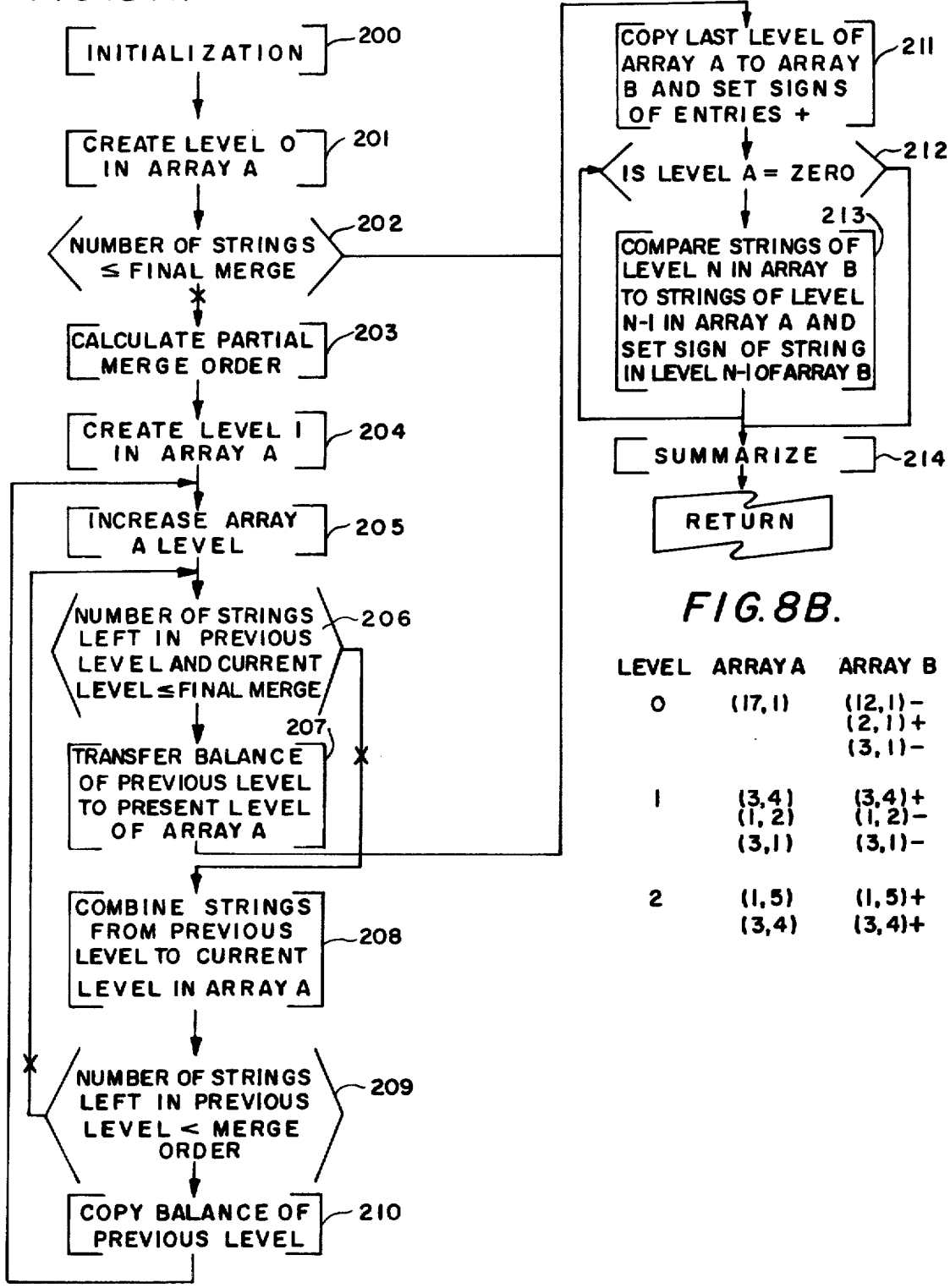

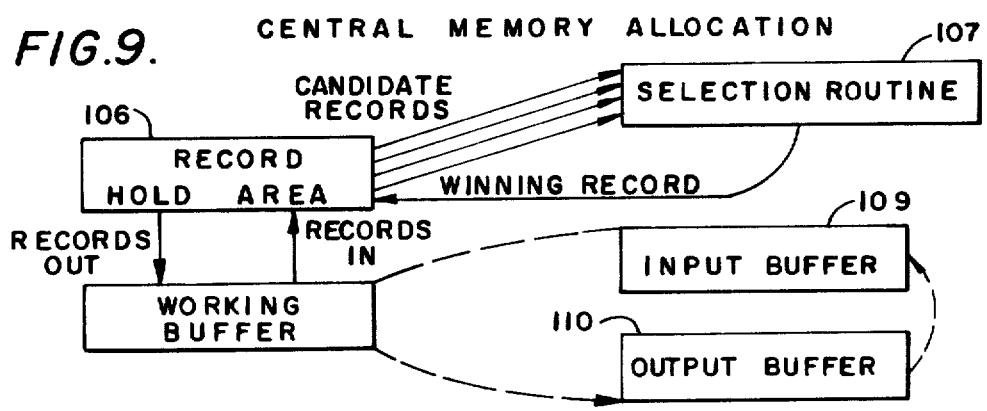
FIG. 9. CENTRAL MEMORY ALLOCATION
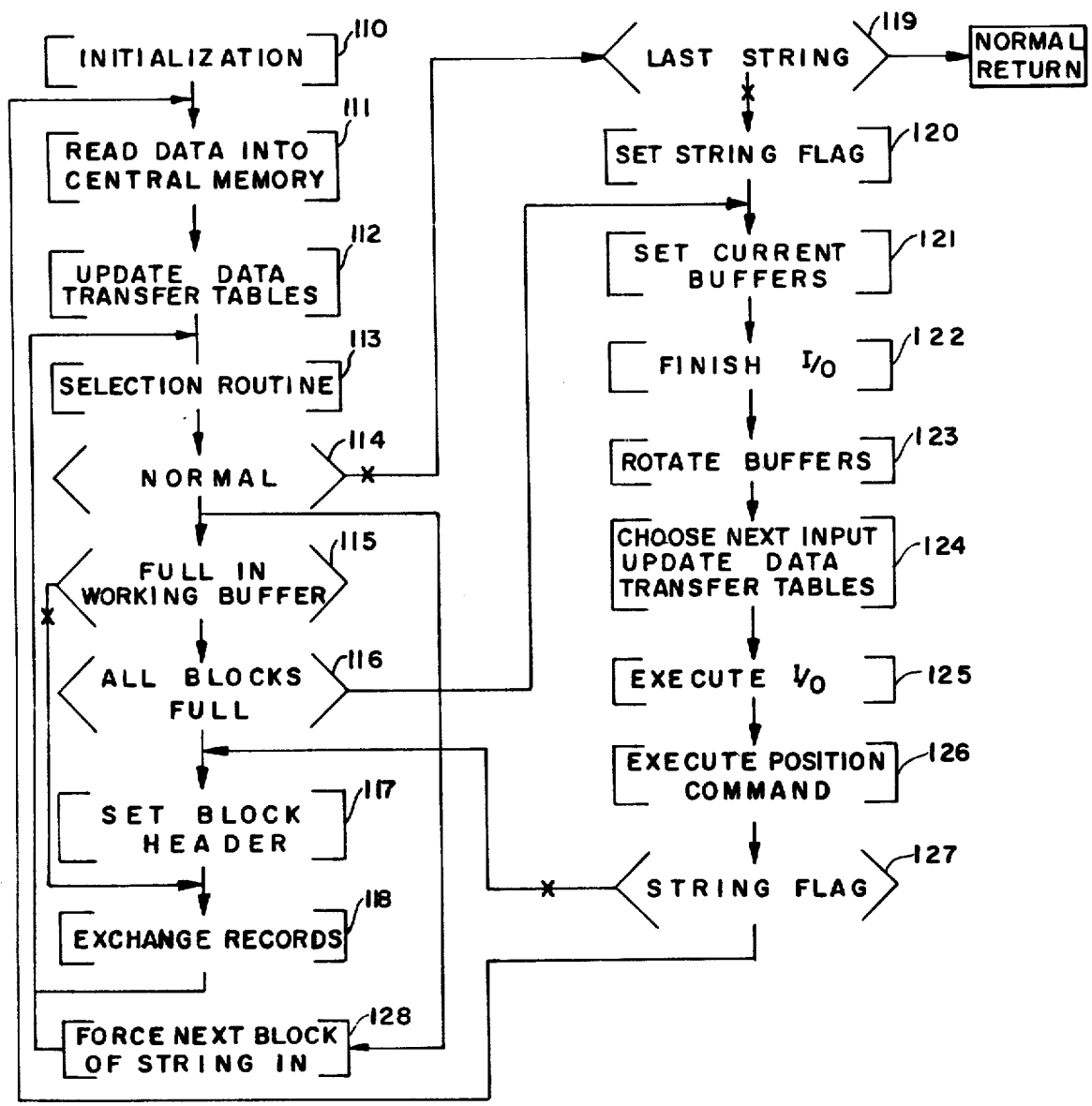
FIG. 12. INITIAL / FINAL MERGE PHASES

FIG.11.
☐ ~ INDICATES CANDIDATE RECORD OF A STRING
✳ ~ INDICATES MEMORY NOT AVAILABLE TO SORT
11(a) RECORD HOLD AREA
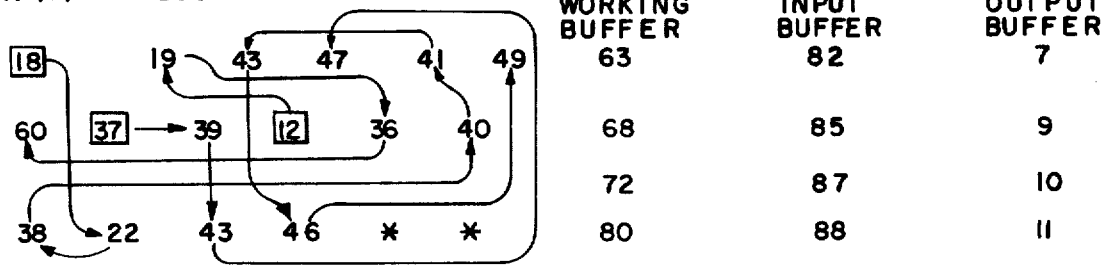
| | WORKING BUFFER | INPUT BUFFER | OUTPUT BUFFER |
|---|---|---|---|
| | 63 | 82 | 7 |
| | 68 | 85 | 9 |
| | 72 | 87 | 10 |
| | 80 | 88 | 11 |
11(b)
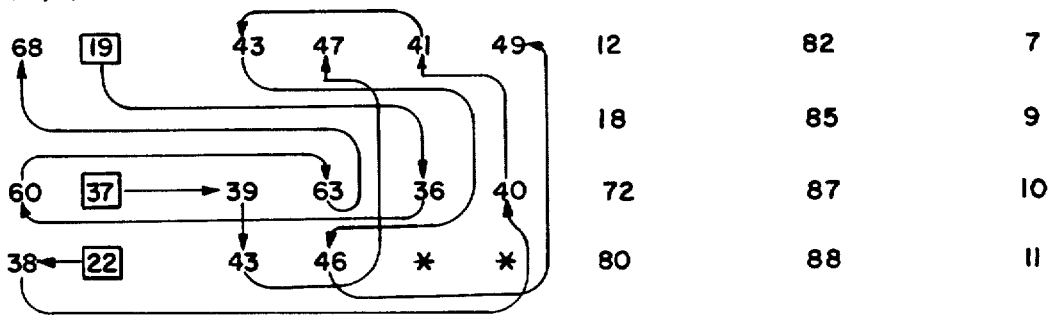
| | | | |
|---|---|---|---|
| | 12 | 82 | 7 |
| | 18 | 85 | 9 |
| | 72 | 87 | 10 |
| | 80 | 88 | 11 |
11(c)
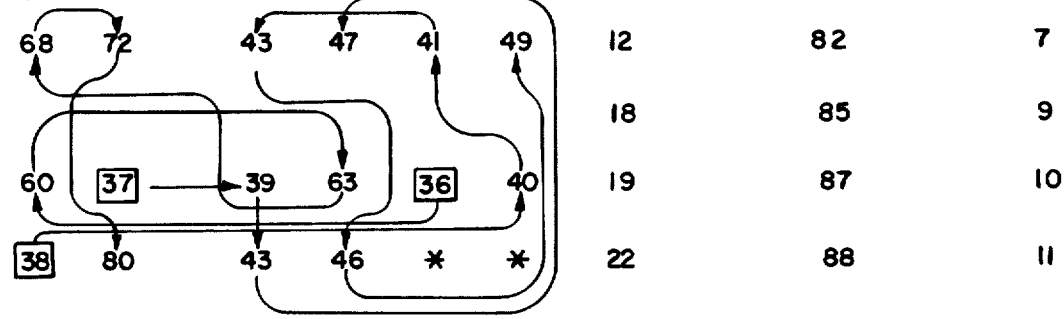
| | | | |
|---|---|---|---|
| | 12 | 82 | 7 |
| | 18 | 85 | 9 |
| | 19 | 87 | 10 |
| | 22 | 88 | 11 |
11(d)
| | | | |
|---|---|---|---|
| | 82 | 48 | 12 |
| | 85 | 52 | 18 |
| | 87 | 56 | 19 |
| | 88 | 57 | 22 |

SORTING SYSTEM

This is a continuation of application Ser. No. 501,874 filed Aug. 30, 1974 (which, in turn, is a continuation of Ser. No. 187,689 filed Oct. 8, 1971).

BACKGROUND OF THE INVENTION

This invention relates broadly to an electronic data processing system, and more specifically, to a method of reducing the time and computer resources required for sorting large quantities of data in such a system.

In sorting statistical, business, scientific, and other data, the use of a general purpose, electronic digital computer is often required for relatively long periods of time during which the process of sorting, not uncommonly requires a substantial proportion of available computer resources. This, taken together with the increased use of computers and the often voluminous and complex nature of data being processed, has made the development of a method for efficiently and rapidly sorting data increasingly important. Sorting, in general, is comprised of two major steps; namely string generation and merging. String generation is a process of accepting unordered data and forming this data into groups of ordered or sequenced data, commonly designated strings. Merging is a process of combining the generated strings into larger strings until one string or one set of strings, as desired, remains. Thus, the input body of data, after the completion of the string generation and merging steps, is in the form of a sequenced or ordered body of data. Generally, the string generation process operates only once on the input data, while the merging process operates on the data as often as necessary to arrive at a single string or a desired set of strings.

In the past, many different sorting techniques were developed, each of which was primarily designed to minimize the execution time of the merging process. Examples of a number of sorting techniques that have been developed are discussed in *Computer Sorting*, Ivan Flores, Prentice Hall, 1969 and "Some Improvements In A Technology of String Merging and Internal Sorting", Martin Goetz, *Conference Proceeding of the American Federation of Information Processing Societies*, Volume 25, pages 599–607, 1964. Because of the availability of random access devices in the widely varying types of data processing systems in use today, there is now a vehicle that can be utilized to reduce the data processing resources presently required in the sorting of large quantities of data. This sorting process presently constitutes a major portion of the workload of present day computer systems. Depending on the system, it may be desired to minimize the time required for throughput, i.e. the total sorting time. The requirements of other systems such as time-sharing systems may require that the resources of the central processing unit be minimized, or the number of calls to the operating systems be minimized. Yet other data processing systems may need to minimize the input/output time and equipment, thereby economizing on such peripheral units as magnetic discs and drums. A flexible sorting method is therefore needed that not only materially reduces computer resources required for sorting but also selectively optimizes the allocation of such computer resources as peripheral equipment, input/output calls, and input/output times.

SHORT STATEMENT OF THE INVENTION

Accordingly, this invention relates to an improved sorting method utilizing a general purpose electronic data processing system. With the system parameters and quantity of data being sorted known, a simulation process is executed to define the optimum block sizes, the optimum input/output (I/O) transfer units, and the format for the retention and manipulation of data during the data manipulation phases. Strings of ordered data are then generated from the input data by a selection technique known as quadratic selection replacement. During the string generation process, the strings are continuously examined to determine if data bias exists. Each time an unfavorable or negative bias is detected, the sequence of future string generation is reversed, thereby converting the detected negative bias to a positive bias. The generated strings are then written in data blocks on one or more random access storage devices with each block being linked to one or more of the preceding and succeeding blocks in the string. Each data block has a header portion which contains the linking information as well as other information about the block and its associated string.

After the data has been formed into strings and temporarily stored in random access storage, the optimum I/O transfer unit is again calculated for the merge phases, and the sequence in which the strings are to be merged is determined so that manipulation of the data is minimized.

The data blocks of a selected set of strings are read into the data processor and stored in central memory in which is defined a record hold area and at least one storage buffer which is a working buffer from which data is moved to and from the record hold area. Generally, there are two additional buffers during the initial merge phase for each available channel, one being an intermediate input buffer and the other being an intermediate output buffer. During the final merge phase, there is usually one intermediate input buffer for each channel in addition to the working buffer. The output during this last phase is treated conventionally, using final output buffers. Except for the final output buffers, the buffers are rotated logically when a block transfer is required. This process of rotating the buffers is called synchronization and occurs either when the working buffer is emptied of input records or when it is filled with output records. A routine is provided for determining the order in which new blocks of data are required during the two merge phases and for selecting the order in which these blocks are to be read based on minimizing seek time and maintaining the continuous flow of data. By anticipating the order in which data blocks are to be read into core storage, the readheads in the random access storage devices can be positioned over the tracks containing the blocks to be read before the blocks are required for merging. Therefore, the aggregation of the seek time normally experienced in accessing data in direct access storage devices is minimized. The aggregation of latency time is reduced by writing blocks of merged strings from the output buffer onto the same or contiguous space of random access storage from which the selected block has just been or is to be read.

The generated strings are then merged, and written back into random access storage as new strings. Successive merges of new strings thus generated are performed until the strings have been reduced to such a number that a final merge phase can combine each of the remaining strings into the desired single string or set of strings of data in one merge pass. The order of merge for each of the merge phases is determined after the input data has been formed into strings or ordered data, i.e., after the string generation stage. The function of determining the order in which the strings are to be merged is provided by a routine which defines each merge within the merge phases. This routine also defines the I/O transfer units for the merge phases which is that optimum number of blocks developed by the string generation phase which will be treated as a unit in the merge phases. A routine is provided for this step which computes the time required for executing the merge phases and computes the merge times which best meet the time parameter specified by the user.

BRIEF DESCRIPTION OF THE DRAWINGS

Other features and advantages of this invention will be more fully appreciated from the following detailed description, appended claims, and accompanying drawings, in which:

FIG. 4A is a schematic block diagram of the method of the pre-string generation phase of this invention.

FIG. 5 is a schematic block diagram of the method of the string generation phase of this invention.

FIG. 6 is a schematic block diagram of the method of the post string generation phase of this invention.

FIG. 7 is a diagram of three possible sequences of merge during the initial merge phase.

FIG. 8A is a schematic illustration of the method of minimizing the data transferred for the initial merge phase.

FIG. 8B is a continuation of the schematic block diagram of FIG. 8A showing the method of minimizing the data transferred for the initial merge phase.

FIG. 9 is a simplified illustration of the central memory allocation and of the process of exchanging the functions of the random access buffers in central memory.

FIG. 10 is an example of a set of strings to be merged.

FIG. 11 is an illustration of a cycle in the merge phase using the example strings.

FIG. 12 is a schematic block diagram of the initial and final merge phases.

DETAILED DESCRIPTION OF THE PREFERRED EMBODIMENT

Introduction

Figure 1:
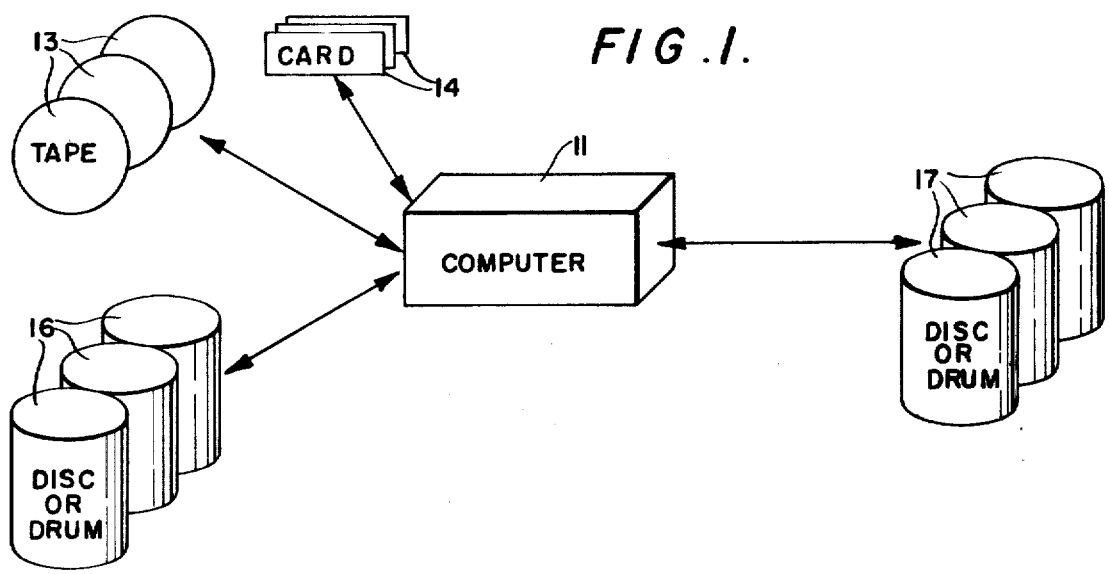
FIG. 1 is an illustration of a typical electronic data processing system.

In order to facilitate the description of the preferred embodiment of the method of this invention, a brief discussion of the environment in which the invention will operate will be presented. Accordingly, refer now to FIG. 1, which is an illustration of a typical electronic data processing system which may be used in practicing this invention. A plurality of input/output devices are provided for conveying information in digital form to a central data processor. The initial input/output devices may include sequential access devices, such as tapes 13 and cards 14, and/or random access devices 16, such as magnetic discs or drums or other computer memory. The general purpose digital computer 11 has an internal storage area, typically of the magnetic core type, which may or may not have sufficient capacity to store the information being fed thereto. In the general case where the computer itself does not have adequate storage capacity, one or more intermediate or auxiliary storage devices 17 are connected to the computer to provide a temporary storage area for the data being processed. These auxiliary storage units usually take the form of magnetic discs or drums, but can be of any other suitable type capable of being directly accessed. The digital computer 11, in addition to having an internal storage area, has a central processing unit comprised of an arithmetic unit for processing the data and a control unit for controlling the arithmetic and storage units.

In the ensuing discussion of the preferred embodiment, it will be assumed that the core memory of the computer 11 is limited either because of the physical size of the sort or because the computer has other demands on its storage space such as, for example, the storage of other operational programs being executed concurrently. It will be assumed that the desired result of the sort process described herein is a single string of ordered data rather than a set of strings and that the simplest unit of data being processed is a record which is simply an operational unit of data generally dependent in form upon the particular data processing system being used. It should be understood, however, that the desired result could be a set of ordered strings rather than a single string.

Figure 2:
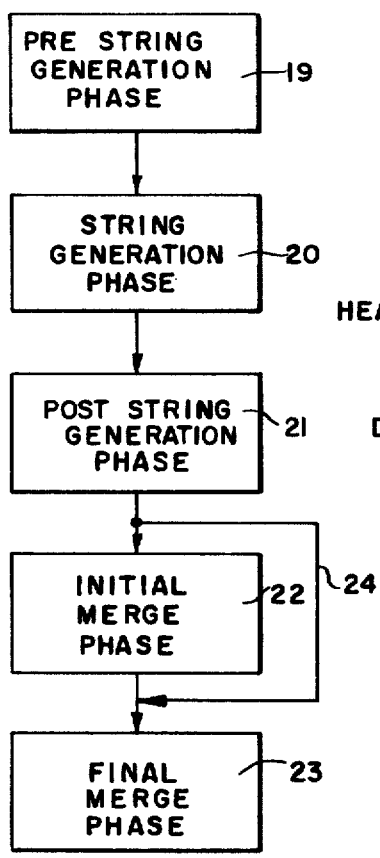
FIG. 2 is a schematic block diagram of the functional operation of the sorting system of this invention.

Refer to FIG. 2, which is a schematic block diagram of the overall method of this invention. Each of the squares represent a major phase of the sort process and will be discussed more fully herein. Initially, the pre-string generation phase 19 determines the optimum block size, the optimum I/O transfer unit, and the storage format in random access storage for minimizing the time and computer resources utilized in the sort process. Th data processor may permit the size of data blocks to be varied, but the size cannot exceed the maximum quantity of data than can be read into or out of the data processor in a single operation. The optimum block size and the optimum I/O transfer unit are dependent upon the number and types of input/output devices assigned to the sort function being processed in the data processing system, the quantity of data to be sorted, the speed of the processor, the length of the records to be stored, the number of available channels and their random access device distribution, and the amount of core storage space available to the sort function being processed. How these factors relate to the optimum block size and optimum I/O transfer unit and how these factors enhance the speed and computer efficiency in a sort process will be described hereinbelow.

The string generation phase 20 performs the function of generating strings of ordered or sequenced data from raw input data. It is an important and novel feature of this invention that the string generation phase maximizes the length of the strings by dynamically and continuously detecting the bias of the data being sorted, and controlling the sequence of string generation in response thereto. Thus, as longer strings are generated, fewer strings will be developed and consequently, the number of merges of the strings required will be reduced. The post-string generation phase 21 performs the function of determining, once again, the optimum I/O transfer unit and the manner or sequence in which the generated strings will be merged. As will be seen, the optimum I/O transfer unit and the sequence of merge is dependent upon the attributes of the particular data processing system considered in the pre-string generation phase in addition to the actual number of strings generated and their block size. The initial merge phase 22 combines the generated strings into a set of strings of ordered data which the final merge phase 23 combines into a single output string or desired set of strings of ordered data. The string generation phase 20, the initial merge phase 22, and the final merge phase 23 are data manipulation phases which are frequently referred to as such hereinbelow.

As contemplated by the invention, if the data has a sufficient, positive or negative bias thereby permitting the string generation phase to generate strings of substantial length, or if the amount of input data is relatively small, there may be so few strings generated that the final merge phase can combine these strings into a single output string without requiring the initial merge phase 22. It is also possible that the optimization has increased the order of merge capable of being performed by the system such that only the final merge phase is required. Thus, as indicated schematically by line 24, the initial merge phase is by-passed.

Before discussing each of the aforementioned phases in detail, the structure of the fundamental operating unit of data, i.e., the block, will be described since the noval block structure utilized in this invention is of critical importance and has resulted in an unexpectedly substantial economy of time and computer resources. Each of the generated strings consists of one or more data ordered blocks which are temporarily stored in random access storage prior to being merged in the merge phases. As will become more fully apparent from the ensuing discussion of the merge phases, it may be desirable to read the strings either forward or backward and consequently each block must be capable of being read either forward or backward. Accordingly, forward and backward block pointers are included in the header information associated with each block of data so that each of the blocks of the string are linked together regardless of the direction in which the blocks of the strings are read. In addition, the efficiency of the data sort can be improved substantially if the header information in each block includes multiple forward and backward pointers, i.e., information linking the block with a plurality of previously generated blocks and with a plurality of blocks to be generated.

In the merge phases, blocks of data are read into the working storage area of the central processing unit in sequential order as they appear in the string. When a next block within a string is required to be red, the channel for the device and the device must be available. Then the readhead of the random access device containing the desired block must travel to the track position of the required block and then wait until the block position comes under the readhead. The time required for moving the readhead to the proper track location is called the "seek" time, and the time required for the block of data to become positioned under the readhead after the readhead is positioned at the proper track location is called the "latency" time. Often, however, the channel of the device containing a desired block of data or the readhead assigned to read the desired block will be temporarily inaccessible because there is some demand on its use. Traditionally, the needed block is waited for and under these conditions results in a considerable delay in the sort process because the reading process does not continue until the required block of data is read into the central processing unit.

By the process of this invention, the delays resulting from channel delay and "latency" and "seek" times have been dramatically reduced. Thus, by a process that will be discussed in greater detail herein, when selecting a block for transfer a determination is made as to whether there is a conflict over the use of a channel or device. If there is a conflict, i.e., there is some other demand on a channel or device, associated with the reading of the next required block, a second most required block ordinarily is evaluated. If however, there is a conflict over the second most required block, the third most required block is evaluated, and so on. These next most required blocks may be read into the central processing unit out of the sequence in which they will be required by the merge process according to the conflict evaluation.

With the aforementioned multiple forward and backward pointers in the header information of each block of data, more than one block of data in a given string can be selected for reading into core storage in advance of the requirement for those blocks. The most needed block can then later be read into the working area storage and properly linked to the other, previously read, blocks so that it is merged in the sequential order that it appears in the string. Accordingly, the input/output portion of the data processor is continuously operating and the data located in several devices may be sought simultaneously resulting in a uniform distribution of computer load and a reduction in sort time due to the reduced waiting due to conflict.

Figure 3:
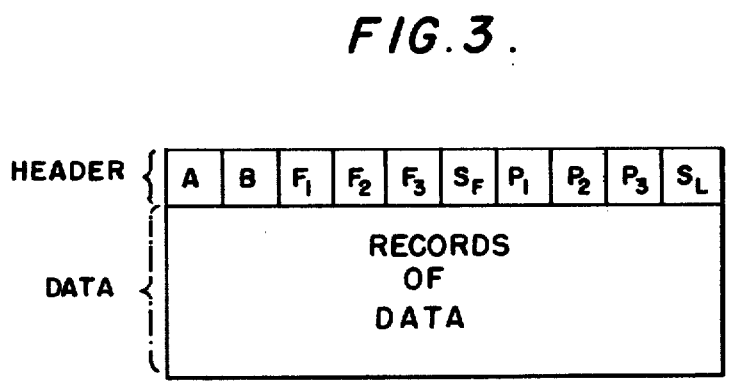
FIG. 3 is an illustration of the format of the data blocks utilized in practicing the method of this invention.

Refer now to FIG. 3 which is a schematic illustration of the format of a typical block of data utilized in the preferred embodiment of the invention. The block is functionally divided into two portions, a header portion more fully described below, and a data portion containing the records of data being sorted. Referring now to the header portion, position A in the block contains information relating to the block and its associated string such as, for example, whether the block is a first or last block in the string, whether the records in the block are to be extracted from the front or back thereof, whether or not the string was generated in reverse sequence, and whether or not the string was generated by the string generation phase. Position B contains information detailing the number of records contained in the block which information is utilized to determine when the block is emptied of input records. Positions $S_F$ and $S_L$ contain information indicating the location of the first and last block of another string. Positions $F_1$, $F_2$, $F_3$, etc. contain pointers indicating the location of the next blocks in the string, the next next block, etc. Thus, these positions contain forward pointers. The positions represented by the letters $P_1$, $P_2$, $P_3$, etc. contain header information indicating the location of the previous block of the string, the previous previous block, etc. Thus, these positions contain backward linking pointers establishing the position of the block with respect to previously generated blocks of the same string. The remaining space in the data block is reserved for the data records which are to be sorted by the method of this invention.

With the environment and a broad overview of the invention having been described along with a discussion of the format of the blocks of data manipulated by the sort process described herein, a more detailed description of the invention can now be presented.

PRE-STRING GENERATION PHASE

Figure 4B:
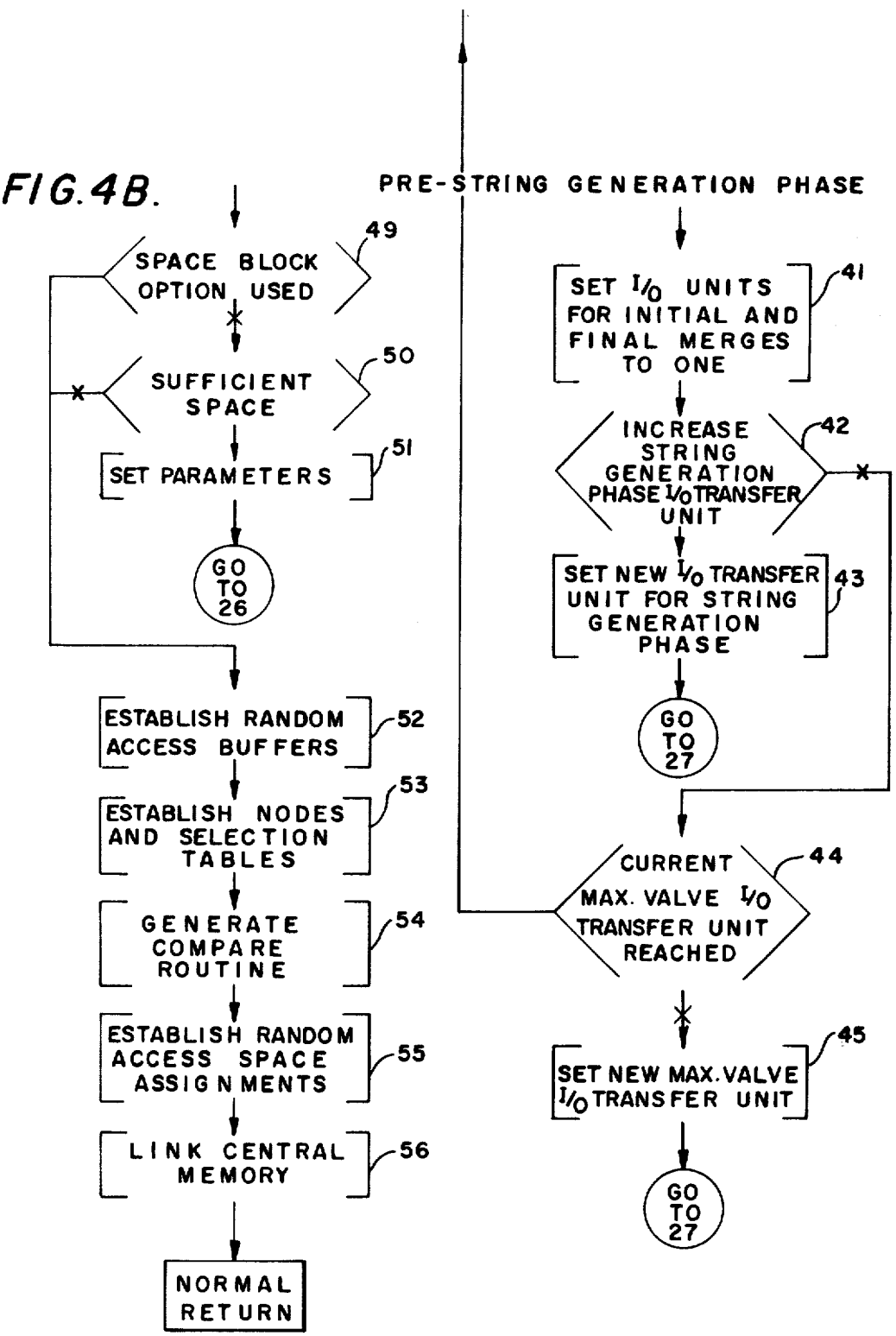
FIG. 4B is a continuation of the schematic block diagram of FIG. 4A showing the pre-strung generation phase of this invention.

The first phase of the sort technique of this invention is called the pre-string generation phase, and is functionally illustrated in schematic block diagram form in FIGS. 4(a) and 4(b). This phase determines both the optimum block length of the blocks of data and the optimum I/O transfer unit for the string generation phase. An I/O transfer unit is comprised of one or more blocks of data and provides added flexibility to the sorting process of this invention by permitting variable quantities of data to be read and written in a given operation during the respective data manipulation phases. Thus, for example, it may be advantageous to write relatively larger quantities of data comprising several blocks during the string generation phase and yet read and write relatively small quantities of data, i.e., a block of data, during the ensuing merge phases. By the technique of established I/O transfer units this can be achieved. The values of the sizes of the blocks and I/O transfer units are dependent on such input parameters as the number of records, i.e., quantity of input data, the available core storage, the number of random access storage devices available, etc., and such calculated parameters as the predicted number of strings and their length, the associated number of merge passes, and the times required to perform the string generation and merge phases of the sort. In attempting to minimize the total sort time, it would appear, as a first assumption, that the largest block size possible, i.e., enough data to fill a track, would be the optimum block size since relatively little time would be required for reading in and writing out data from the random access storage devices because large quantities of data would be read or written at a given instance. These large blocks would also tend to reduce the number of input/output operations, and tend to increase the efficiency of the use of random access devices both because the block would occupy an entire fundamental storage unit of a device, e.g., a full track, and because the need for auxiliary data such as contained in the heading of each block would be minimized. However, in certain instances, such as when throughput time is to be minimized, or when circumstances require that a minimum amount of core space be allotted to the sorting function, the blocks of data might be reduced in size. Such a reduction may also increase the possible order of merge, thereby decreasing the number of merge passes. Accordingly, the pre-string generation phase takes into consideration the aforementioned variables, along with others, to optimize the block length so that the sort is performed with the maximum of speed and/or computer efficiency. This optimization of block size is an iterative procedure that also takes into account the second optimizing function of this phase, which is the optimization of the I/O transfer units used by the succeeding data manipulating phases.

The pre-string generation phase also performs a third very valuable function; namely, providing an optimum format for positioning the blocks of data in random access storage. It is a characteristic of this invention to synchronize read and write operations, and therefore it is possible to perform a write operation on the merged blocks of data immediately after a block of unmerged data is read into the central processing unit or vice versa. This results in a reduction of what is commonly known as the "latency" time which is the time required for physically bringing the data that is to be read or the space in which data is to be written under the readheads. Further, because the read and write operations are coupled, only one positioning of the readheads in required as opposed to two positionings in the prior art, thus the "seek" time for moving the readhead to the proper location is substantially reduced. This synchronizing can be accomplished by placing space blocks, i.e., empty blocks, in each track of random access storage so that immediately after a block of data is read from or written to the track, an empty block or read block respectively, appears under the readhead. Information to be written from the central processing unit can then be immediately written before or after the read into this open space. This result can alternatively be accomplished by writing into the space which has just been emptied by a read. This alternative is particularly advantageous if the available amount of random access storage limits the use of space blocks, or if the size of the block is large. The pre-string generation phase takes these conditions into consideration and generates an optimum format for establishing and positioning space blocks and data blocks in the random access storage area. The reduction of "latency" and "seek" time is further enhanced by a unique method of this invention during the string generation phase which distributes the fundamental storage units, e.g., tracks, of the random access devices according to the access hierarchy of available channels first, available devices next, and finally within available devices last. This is the opposite of the usual practice of distributing these fundamental storage units in the access hierarchy of tracks within devices first, available access devices next and finally available channels last. This results in a number of improvements, for example the statistical average time for writing data into random access storage is now only 1¼ revolutions of a track for full block transfer rather than a minimum of two revolutions as in typical prior art methods. Thus, the "latency" time is reduced by at least ¼ a revolution of a track. The "seek" time is reduced since the readhead of one device is moving to the next track location while the readhead of another device is writing data. Such an access hierarchy gives the added advantageous results of reduced arm movement in the devices, an even distribution of data over the several devices and channels and finally, as will be apparent hereinbelow, the conflict in anticipating data to be read for the merge phases is reduced.

Refer now to FIGS. 4(a) and 4(b) which are a schematic block diagram of the pre-string generation process. The initialization step 25 simply reads the system parameters such as core storage and random access space available, the time required to read/write data, the speed of the random access storage devices and other such parameters into the central processing unit. In addition, the initalization step will set a number of variables, such as the initial maximum block size, to predetermined values so that the logical flow of the process will be followed in the first pass. At the completion of this step, all the block sizes for the data manipulator phases are set to the current maximum block size by routine 26. As was pointed out above, the initial maximum value is set in routine 25 and would normally be a full fundamental storage unit, i.e. the maximum transfer capability of the random access devices being used. A limitation which would prevent the use of such an initial maximum value arises if the amount of central memory working core storage allocated to the sort is insufficient to permit a merge order of two on data blocks of that size. In that instance the initial maximum block size is set to that fraction of a full fundamental storage unit which will permit at least a merge order of two. Routine 26 also sets the I/O transfer unit for each phase to its maximum which initially is that number of blocks of the current maximum block size that can be stored in a fundamental storage unit. Next, the times required for each of the data manipulation phases are calculated using the current maximum value for the respective block sizes, and I/O transfer units, the required input parameters and the required predicted values mentioned above. Routine 27 performs this calculation for the string generation phase. At this point a test is made by routine 28 to determine if the initial merge phase can be bypassed. This will be the case if the maximum possible final order of merge equals or exceeds the predicted number of strings to be generated. If it does, then the time for the initial merge phase is set to zero and a transfer is made to routine 30. If not, routine 29 performs the time calculation for the initial merge phase. Routine 30 performs the time calculation for the final merge phase. Routine 31 then computes the sum of the times calculated for the data manipulation phases and stores the sum ($T_1$). Routine 32 then tests to determine if this sum ($T_1$) is 50% greater than the minimum previously calculated sum (T). For the first pass, the value (T) is set arbitrarily high by the initialization routine and transfer is made to routine 33. Routine 33 tests to determine if the current time ($T_1$) is less than the previous time; if it is, then routine 34 replaces the previous time with the current time and routine 35 saves the conditions, i.e., the block size and I/O transfer units giving rise to that time.

At this point the various iterations which are the essence of the pre-string generation phase optimization method will be entered, and in order to present a more general explanation of the process, a set of nontrivial conditions will be assumed that are representative of the type of conditions that might be encountered in a typical data processing environment. It will be assumed therefore, that central memory conditions are such that a block size may be a full fundamental storage unit and that the length of the data records are such that the maximum block size, which will permit at least a merge order of two, is a size such that a full fundamental storage unit will accommodate one block and that no more than six blocks will constitute an I/O transfer unit. It is assumed that the data processor is capable of transferring in one operation at least that number of records that would completely fill a fundamental storage unit of random access storage. In this situation an I/O transfer unit can be defined for all of the data manipulation phases, namely, the string generation phase, the initial merge phase, and the final merge phase. The maximum I/O transfer unit is defined as that number of maximum block size blocks that are stored in a fundamental storage unit. The I/O transfer unit of each phase is that number of blocks that are transferred between central memory and random access memory upon the execution of a read or write operation in that phase. The I/O transfer units of each phase are restricted in that they must be a factor of the current I/O transfer unit value being iterated. In addition the I/O transfer unit for the final merge phase may not be greater than that of the initial merge phase. The permutations of the values of the I/O transfer units for the data manipulation phases is one of the iterations performed by the pre-string generation process. The other iteration is performed on the block size. The constraints which bound this iteration are the minimum allowable order of merge, the size of the records being sorted, the amount of random access storage space available, and the physical properties of the random access devices being used.

Returning now to FIGS. 4(a) and 4(b); Routine 36 determines if the I/O transfer unit of the final merge phase can be increased. As will be seen, every time a complete pass is made through the iteration routines 36–42, a new value for the string generation I/O transfer unit will be set by routine 44 and the permutations of that value will be iterated for all phases. Using the aforementioned set of assumed conditions, the values and sequence of permutations of the I/O transfer unit sizes to be tried for the respective data manipulation phases are 111, 111, 121, 122, 211, 221, 222, 111, 131, 133, 311, 331, 333, 111, 121, 122, 141, 142, 144, 211, 221, 222, 241, 242, 244, 411, 421, 422, 441, 442, 444, 111, 151, 155, 511, 551, 555, 111, 121, 122, 131, 133, 161, 162, 163, 166, 211, 221, 222, 231, 233, 261, 262, 263, 266, 311, 321, 322, 331, 333, 361, 362, 363, 366, 611, 621, 622, 631, 633, 661, 662, 663, and finally 666, which for the purposes of this example has been defined as the maximum number of maximum block size blocks that meet the constraints chosen. For purposes of illustration, assume that the current value of the I/O transfer unit was set by routine 39 at 221, for the string generation phase, the initial merge phase and the final merge phase respectively. If the value of the I/O transfer unit can be increased, routine 37 will increase the I/O transfer unit for the final merge phase. In the example the values of the I/O transfer units would now become 222, and control is returned to routine 28. When the I/O transfer unit of the final merge phase cannot be further increased, i.e., it is equal to the initial merge value, control is transferred to routine 38, which determines if the I/O transfer unit of the initial merge phase can be increased. If it can be, routine 39 sets the new values and because of the constraint pointed out above, routine 40 sets the value of the I/O transfer unit of the final merge phase equal to one. The routines 38–40 represent the second level of iteration performed on the values of the I/O transfer units, and in the example, the next pass through these routines would set the values at 241 and control is returned to routine 28. When the I/O transfer unit of the initial merge phase cannot be further increased, control is transferred to routine 41 which resets the value of the I/O transfer units for the final and initial merge phases to one. Routine 42 now determines if the I/O transfer unit for the string generation phase can be increased, which marks the beginning of the third level of iteration of the values of the I/O transfer units. Routine 43 sets the new values, which in the example become 411, and control is returned to routine 27. When the I/O transfer unit of the string generation phase cannot be further increased, control is transferred to routine 44 which determines if the current maximum value for the I/O transfer unit has been reached. If it has not, routine 45 sets a new current maximum value and control is transferred to routine 27 to begin a new iteration. Thus, if the current value is 4, the new value would become 5 and all the possible iterations performed by routines 36–42 would be 111; 151; 155; 511; 551; and 555. When the current maximum limit of the I/O transfer unit is reached, control is transferred to routine 46.

Routine 46 begins the iteration of the block size, which is the second parameter that is optimized by the prestring generation phase. As can be seen in the figure, the iteration of this parameter is commenced either when the iterations of the I/O transfer unit have produced an unsatisfactory time (through the test of routine 32), or when the possible iterations of the I/O transfer unit have been exhausted (from routine 44). Routine 46 determines whether or not the current maximum size can be reduced within the constraints of the record lengths being sorted, the available random access storage space and the physical characteristics of the random access devices being used. The block size will not be reduced below a fraction of the maximum possible block size that is determined by those constraints and below which practicable operation of the sort is not possible. One obvious lower bound is the length of a record of data being sorted. If the block size can be reduced, routine 47 reduces the size (usually by one record length) sets the current maximum value for the I/O transfer unit, and sets the new value for the maximum block size. A reduction in block size will permit an increase in the maximum value of the I/O transfer unit since more blocks of the new sizes can be stored in a fundamental storage unit. Thus, routine 26 will set this new maximum I/O transfer unit value. Routine 48 determines if the new maximum block size has increased the possible order of merge. If it has, control is returned to routine 26 and a new iteration of the I/O transfer unit is begun. If the merge order has not been increased, a further reduction in block size is attempted and the procedure is repeated until no further reductions are possible.

As was mentioned above, the pre-string generation phase performs a third optimization in that it determines the format of the allocation of available random access storage space. A part of this optimization is an attempt to reduce latency times by allocating space blocks contiguous to data blocks, so that contiguous read/write and write/read operations may be performed during the merge phases of the sort. This function is performed by routines 49-51 of FIG 4. If the block size for a given iteration cannot be further reduced, routine 49 determines if a space block option has already been tried for the current block size. If it has, control is transferred to routine 52. If it has not, routine 50 determines if the available random access storage space is sufficient to permit the use of space blocks. The criteria for sufficient space is that there be at least enough space to store $(2+2/n)$ times the number of blocks required at the current maximum block size, where (n) is the predicted number of blocks per string. If the space is not sufficient, control is transferred to routine 52. If space is available, then routine 51 sets the parameters indicating that a space block is to be associated with each data block and initializes the maximum block size. Control is then returned to routine 26 and the iteration procedure is followed utilizing this information.

When all of the above optimization functions have been performed, the final optimization of allocating the available random access storage and the available central memory is performed by routines 52-56. Routine 52 establishes the physical location of the random access buffers in central memory. A single working buffer is established and one output buffer is established for each available channel. The buffers are capable of storing the number of records that are contained in the I/O transfer unit established for the string generation phase. Routine 53 establishes the physical location in central memory of the nodes and the tables required by the selection technique used. For the quadratic selection replacement technique, a typical node contains a pointer to the next node, a number of record pointers and an indication of the data content in the node. Routine 54 generates the compare program used by the selection technique in all phases. Next, routine 55 establishes and generates tables that are used to control the flow of data between central memory and random access storage. A unique property of these tables is that the available fundamental storage units are assigned in a hierarchy that is the reverse of assignment hierarchies normally employed in data processing systems. The use of such an unusual hierarchy substantially reduces the possibility of conflict between device access commands, because the data stored in the fundamental storage units is first distributed across available channels and then across devices within a channel. Finally, routine 56 creates the necessary links between the record hold area and its associated nodes. At the completion of that operation, a normal return is made and the process is ready to execute the string generation phase.

STRING GENERATION PHASE

The string generation process is schematically illustrated by FIG. 5. However, before the detailed description of the process illustrated in FIG. 5, a few general preliminary comments will be helpful in understanding this portion of the invention. Although a number of string generation methods exist in the prior art, techniques for maximizing the length of the generated strings, and thereby reducing the number of merges required in the succeeding merge phases, have been improved which as a result substantially reduce sorting time.

It is known that if input data is characterized as having a bias, i.e., the data is already partially ordered, the length of the generated strings will be affected. Thus, for example, if there is a positive string bias, i.e., the data tends to be ordered in the desired sequence, which is the sequence of the data in the strings generated by the quadratic selection routine, longer strings of data than expected will be generated. This occurs since the expected length of the generated strings is calculated by assuming perfect randomness of the input data. In the extreme, if the input body of data is uniformly, positively biased throughout, only one string will be generated and the sort process will be completed, requiring only the final merge phase. This, of course, would rarely occur in practice.

If the input data is characterized by a negative bias, i.e., the data tends to be ordered in a sequence opposite to the desired sequence, relatively short strings are normally developed and consequently a large number of such strings are generated. This condition frequently results in longer execution time for the merge phases of the sort.

The string generation phase of this invention takes advantage of negative data bias to generate relatively long strings of data just as would occur if the data were positively biased. The technique for accomplishing this may be more easily described by referring to FIG. 5. After the initial parameters of the system have been read into the computer and internal variable initialization has been performed in accordance with routine 60, a test 61 is conducted to determine if more records are available from the input/output devices. If more records are available, a record is provided by routine 62. If routine 62 discovers that no records can be provided, it sets the indicator for routine 61 and proceeds to routine 63; otherwise it transfers to routine 64. If routine 63 is entered, by either routines 61 and 62, a 'flush' entry is given to routine 64. Routine 64 generates strings according to the method of quadratic selection replacement. A similar technique is fully described in *"An Analysis of Inernal Computing Sorting"*, Ivan Flores, JACM, Vol. A, pages 41-80, 1961. If the output from routine 64 is a 'flush' record, the record hold area has been exhausted. Routine 66 sets the final flag and the last buffer blocks are written by routine 75. If the output from routine 64 is not a 'flush' record, test 65 will fail and routine 67 is entered. If the record is for the same string as the previous record, a test is made by routine 68 to determine if the present output block is full. If it is not, the new record is placed in the block by routine 71 and the output count is increased. Control is then returned to routine 61. Routine 72 can be entered from routines 66 and 67. In either case, an end-of-string indicator (EOS) is placed in the last block header for each string which is completed. Routine 73 sets a new string flag so that the first block header for the next set of blocks which are initialized as normal blocks by routine 77, will be altered by routine 78 to indicate a new string (NS). Routine 74 places the record counts and proper 'next' and previous pointers in the headers to be written. It also indicates tha this string has been produced by this phase rather than by a merge phase. It also indicates whether the blocks have been reversed and from which end they would normally be emptied. If a block is a first and/or last block in a string, identification of first and last block of a previous string are stored in the block headers and the addresses of the current string first and last blocks are saved for a future string. Routine 75 writes the completed blocks. Routine 76 determines if the last block has been written by checking the final flag set by Routine 66. Routine 77 establishes a new I/O transfer unit and routine 78 initializes new block headers. If the NS flag is on, routine 79 places an NS indicator in the first block.

At this time, the data is tested to determine if an indication of negative data bias exists. This is accomplished by routine 80 wherein the output string is tested to determine if the generated string contains less than 1.8R where R is the number of records in the record hold area of the central processing unit 11. As is well-known, the expected generated string length, if the input data is random, is twice the number of records contained in the assigned record hold area, i.e., 2R. Any variations in the length of a generated string from this expected string length is due to a bias in the data. When strings are generated having less than the expected string length, a negative bias exists and may be an indication that a reversal of the sequence of data ordering is desirable, e.g., it is desirable to generate strings according to a decreasing key value rather than an increasing key value. By the method of this invention, this indication is evaluated by routine 80 to determine if the short string (i.e., less than 1.8R) is a string that was produced as the next string after a key value reversal, If it is not, then the key value reversal procedure is initiated and the negative bias is converted into a more favorable positive bias. The method of his invention permits the generation of strings is this manner because of the existence of the unique forward and backward pointers in the header information of each block. Thus, a string requiring its blocks rto be read in the reverse sequence from their generation, is simply read backward in the merge phases by using the backward pointers as forward pointers.

In the preferred embodiment, the order of string generation is not reversed each time a negative bias is detected. As was stated above in the evaluation performed by routine 80, the length of each generated string is compared with a standard string length of 1.8 times the number of records in the record hold area. If the length of the generated string is less than or equal to 1.8R and the string was not the next string after a reversal, the comparison decision command for generating the string after the next string, i.e., the next next string, is reversed so that the order or sequence of data for that string is reversed by the instructions of routine 81. However, if the generated string length is greater than 1.8R, the comparison decision command for the string to be generated after the next remains the same as the present sequence of generation. The instruction to maintain the current generation sequence in the next next string is given by routine 80. By following this procedure a smoothing is effected (i.e., elimination of reversal due to production of short strings caused by randomness or by reversal), thereby maximizing the advantages of exploiting the negative bias in the input data while limiting the disruptions in the overall sort procedure. It should be understood that any length of string less than or equal to 2R could be chosen to establish a criterion for determining negative string bias, but it was discovered that 1.8R results in a significant contribution to the improvements that taking advantage of negative bias adds to the sort process.

At this time, the string generation phase is completed and the post-string generation phase begins.

POST-STRING GENERATION PHASE

Prior to performing any merging of the strings generated by the sort, an attempt is made to improve the operation of the merge phases by an optimization procedure similar to that of the pre-string generation phase. As will be remembered that phase fixed the block size for the string generation phase, and based on a prediction of the number of strings to be generated, determined the optimum I/O transfer units for the merge phases. However, particularly due to the operation of the features of the invention that treat bias in the data, the actual number of strings generated is likely to differ from the predicted number. It is, therefore, advantageous to attempt another optimization of the I/O transfer units of the merge phases using the actual number and length of strings generated. The fact that the block size of the string generation phase has been fixed, however, places a constraint on this optimization attempt. In other respects the operation of this phase in choosing I/O transfer units for the merge phases is similar to that used in the pre-string generation phase.

The possibility of extensive improvement in the merge operations is greatly enhanced, becuase of the unique properties of the method of this invention. One of these properties introduces the possibility of performing an intermediate order of merge which is lower than the maximum possible order, whereas in the prior art sort methods, the merge process is performed at the maximum possible order of merge until the final merge which may be of a lower order. Thus, an optimization of the merge process can be performed which significantly reduces the transfer of data during the initial merge phase. In the preferred embodiment this process is utilized to minimize the number of times that the generated strings are operated upon. This optimization phase of the invention also uses the actual number of strings generated rather than the pre-generation predicted number. Such an optimization has been used in the prior art. Based on these two properties all of the possible transfer units with their associated particular merge sequence are simulated and the optimum is chosen.

Referring to FIG. 6, the initial input parameters are read into the central processing unit in accordance with the instructions of routine 82. These parameters are generally the same as those read into the central processing unit at the initiation of the pre-string generation phase but include the indicator as to whether space blocks have been allocated. After this has been completed, the I/O transfer units for the merge phases are set to the size of one block by routine 83. This value is the minimum number of blocks created by the string generation phase that are capable of being transferred in one read/write operation. Routines 84–95 perform operations in this phase that are substantially identical to the operations performed by routines 28–40 of the pre-string generation phase. The function of routine 84 is equivalent to that of routine 28; that of routine 85 to routine 29; that of routine 86 to routine 30; that of routine 87 to routine 31; that of routine 88 to routine 33; that of routine 89 to routine 34; that of routine 90 to routine 35; that of routine 91 to routine 36; that of routine 92 to routine 37; that of routine 93 to routine 38; that of routine 94 to routine 39; and that of routine 95 to routine 40. It should be noted that this phase does not have a routine equivalent to routine 46 of the pre-string generation phase, because the block size used herein was set by that phase and can no longer be iterated.

When the optimization is complete, the optimum I/O transfer unit values have been determined. Routine 99 then sets the value of the highest order of merge that can be performed using the optimum I/O transfer units and the available central memory space. Next, routine 100 determines the number of strings to be merged for each operation of the merge phases. It also determines whether a particular set of strings is to be merged in a forward or backward direction. The merge is simulated and the number of times a string's data is merged is counted. If the number is odd, a reverse merge is used for that original string otherwise a forward merge is used. The reason for such a reverse merge is that strings generated by this phase are always reversed when they become input data to another merge. There are many ways of merging strings when the number of strings is more than the maximum order of merge. A feature of this invention is that if a partial merge pass is to be performed, it occurs at the first merge level, i.e., the partial merge is performed on strings generated by the string generation phase. FIG. 7 illustrates the importance of this concept. Assuming, for example, that the maximum possible order of merge is 4, (i.e., only four strings at a time can be merged into a new ordered string); 7(a) illustrates a partial merge at the final merge level; 7(b) illustrates a partial merge at an intermediate merge level; and 7 (c) illustrates a partial merge at the initial merge level. During each merge phase illustrated, the equivalent number of strings passed is:

$7(a) = 32$ $7(b) = 29$ $7(c) = 19$

Clearly the merge illustrated in 7 (c) is a significant improvement over the other examples, in terms of the total amount of data handled.

For a more detailed discussion of how the optimum order of merge is established, i.e., the process of routine 100, refer to FIGS. 8(a) and 8(b). FIG. 8(a) is a flow diagram of the method of establishing the optimum order of merge and FIG. 8(b) illustrates two tables derived during the process schematically shown by FIG. 8(a). To simulate the sort treatment of strings by number, two arrays A and B are constructed, each array having a plurality of levels within it. Array A keeps track of the strings as they are merged and the number of previous level strings that each merged string represents. For example, an entry in this table may be (6,4) which means there are six strings present at that entry level, with each string being comprised of four strings combined or merged from a previous stage level. The array A of FIG. 8(B) is derived from the string arrangement shown in FIG. 7C. Thus, level O has seventeen strings each being one original string length long. Level 1 has seven strings comprised of three strings each having four original strings, one string having two original strings and three strings each having only the original or unmerged strings derived from the string generation phase.

Array B utilizes the contents of Array A to effectively trace each string backward to determine if it is to be merged an even or odd number of times. If odd, the initial string will be merged backward; if even it will be merged forward.

Array B is initialized by copying the last level from Array A and setting each group of strings positive as shown. By inspection of level 1 of array A, it can easily be seen that the (1,5) entry of level 2 was derived by merging 4 strings while the (3,4) entry was derived by direct transferral without merging from level 1. Thus, the signs change only for entries (3,1) and (1,2) which were merged to form the (1,5) entry. A similiar inspection of level 0 indicates that the (3,1) entry was transferred from level 0 of the A array. Accordingly its sign does not change. By the aforementioned inspection process, it can be seen that twelve strings will be merged backward, then two forward and then three backward.

Refer now to FIG. 8(a) for a discussion of the process for selecting the optimum merge sequence. Routine 200 initializes the routine by reading the relevant parameters such as the number of strings generated by the string generation phase.

A table is then formed by routine 201 which establishes the level 0 of array A. Routine 202 conducts a test to determine if the number of strings listed in level 0 of array A is less than or equal to the maximum possible final order of merge.

If the number of strings is less than the final order of merge, then the initial merge phase is by-passed and a partial order of merge need not be determined. However, if the number of strings is greater than the final order of merge, routine 203 will calculate a partial order of merge according to the following formula:

$$Q = \frac{(STRINGS) - (LAST) + 1}{(MID) - 1}$$

Where STRINGS is the total number of strings generated during the string generation phase, LAST is the maximum order of merge for the final merge phase and MID is the maximum order of merge during the intermediate merge phase which order of merge may or may not be equal to LAST. If there is no remainder associated with Q then the partial order of merge is determined by the following formula:

partial order of merge = (MID) − 1

If the remainder is 1 then there is no partial order of merge, and if the remainder is two or more, the partial order of merge is equal to the remainder. Referring to the string arrangement of FIG. 7C which includes a total of 17 strings with a maximum order of merge for the intermediate and final merge phases each being equal to four, the remainder derived from the aforementioned formula is two. Accordingly, the partial order of merge for the first level of merge in the initial merge phase is two. Thereafter in each of the succeeding merge phases a full order merge is performed. Once the partial order of merge is determined, the next level i.e., level 1, of the array A is established by routine 204. Then routine 205 creates the next succeeding array levels which are levels 2, 3, 4... until the following test is satisfied. This test is then conducted by routine 206 to determine if the sum of the number of strings left unmerged in the previous level and the strings in the current level is less than or equal to the final order of merge. If the total number is less than or equal to the final merge order, routine 207 transfers the remaining strings in the previous level to the current level of array A. If the number of strings is greater than the final merge order, routine 208 combines the strings of the previous level according to the order of merge and places them in the current level of array A. Routine 209 then conducts a test to determine if the number of strings left in the previous level is less than the final merge order. If the number of strings left is greater than the final merge order, the process is returned to routine 206. If the number of strings left in the previous level is less than the merge order, routine 210 copies the balance of the strings remaining in the previous level and returns the process to routine 205. When the number of strings remaining is finally equal to or less than the final merge order, routine 211 will form an array B into which is copied the last level of array A. Each entry of the initial level, i.e., level 2, of array B has their signs set positive (+). A test is then conducted by routine 212 to determine if the level of array A being copied is the zero level. If it is not, then routine 213 compares the strings of the current level in array B to the strings of the corresponding previous level in array A and sets the sign of the entry in array B accordingly. Referring to FIG. 8 (b) this is achieved by comparing the entries of level 2 of array B with the entries of level 1 of array A. It can be seen that the level 2 entry (3,4) of array B corresponds to the level 1 entry (3,4) of array A since the (3,4) entry of array A was transferred to the level 2 intact without going through a merge process. The sign of entry (3,4) of level 1 of array B therefore remains the same as in level 2 of array B. It can also be seen that the (1,5) entry of array B is derived from entry (1,2) and (3,1) of array A since these entries were merged to form the (1,5) of array B. Accordingly, the sings of the (1,2) and (3,1) entries of level 1 of array B are given minus (−) signs. When signs for each level has been set, the process is returned to routine 212 to determine if the present level of array A is zero. If it is, then the results are summarized and the program returned to routine 101 of FIG. 6.

After the merge table has been developed, routine 101 establishes the physical location in central memory of the random access buffers; a single working buffer and one input buffer and one output buffer for the initial merge phase being established for each available channel. Routine 102 establishes the physical location in central memory of the nodes and the tables required by the selection technique used. For the quadratic selection replacement technique, a typical node contains a pointer to the next node, a number of string pointers and an indication of the data content in the node. Routine 103 generates the table required by the selection routine. Representative tables are; an Associated List and Slot Position Table that orders the blocks of records in central memory according to the key value of the last record in each block; an Associated List Table that controls the sequence of blocks for each input string; a Slot Table that controls the records in a string for the blocks of that string and controls the blocks in the Associated List Table related to a particular slot and holds the I/O commands chosen for future blocks in a particular string. Routine 104 establishes working storage random access tables in addition to those established by routine 55. Representative of these tables are: a Channel List Table that controls the allocation of channel buffers to the channels; a Channel Buffer Table that controls the assignment of command buffers; Channel Rate, Device Rate, and Cylinder Rate Tables that retain the history of the use of their respective elements so that the read/write conflict can be dynamically determined; a Command Buffer Table that controls the flow of I/O transfer units between central memory and random access memory; a Style Table that provides read/write parameters for the development of commands; a Type Table that converts the previous treatment of data to a future desired treatment thereof and is also used to implement either the write over read or write contiguous to read options of the invention depending upon the current status of the block couple; a Backward Table, that retains previous block locations for blocks of the string being generated; and a Future Table, that queues the most desirable sequence of blocks so that seeks may be given to their respective devices. Finally, Routine 105 creates the necessary links between the record hold area and the nodes established by Routine 101. At the completion of those functions, a normal return is made and the process is ready to execute the merge phases.

INITIAL MERGE PHASE

The initial merge phase combines the generated strings into strings of greater length until the number of strings have been reduced to such a level that the final merge can be conducted in a single maximum order merge pass. Thus, if the utilization of the working storage area available in the central processing unit is defined by the post-string generation phase such that a maximum of a ten-way merge can be accomplished in one pass, and if more than ten strings are generated, the initial merge phase must combine the generated strings until exactly ten strings of data remain. Before discussing the details of this phase, certain unique features of the invention that are utilized in this phase will be discussed.

One of these features, that contributes to a more efficient use of the central memory resources of the data processor, is a unique treatment of random access storage buffers. The size and number of buffers required for the merge phases is established by routine 101 of the post-string generation phase, the size of the buffers having been determined by the optimum I/O transfer units and the number of buffers being twice the number of available channels plus one working buffer. The fact that only one working buffer is required for all of the channels instead of the usual working buffer of each merge order is one of the principle reasons that the central memory requirements of the sort method of this invention are used more efficiently. Another principle reason is that the synchronization of read and write operations maintains a full memory of records as compared to an expected one-half full in the prior art. Such full memory is an aid in allowing blocks within strings to be read out of sequence when desired thereby reducing I/O conflict. Refer now to FIG. 9, which depicts in block form, the relation in central memory of the random access buffers to the record hold area used by the selection routine. The record hold area 106 contains at least one record from each string being merged. Each record in the record hold area from a given string is linked to the next record of that string, hence the distribution of records in the physical space of the memory may be random. The selection routine 107 selects from among the candidate records (i.e., first records of each string) a winning record. The designated winning record is exchanged with an input record from the working buffer, as will be more fully explained hereinbelow. When the working buffer is filled with winning records, or if the hardware permits, the addresses of winning records, a rotation of the buffers is performed. The working buffer 108 is designated the new output buffer. The input buffer 109 is designated the new working buffer and the output buffer 110 is designated the new input buffer. After the buffer rotation, a read or combination of a read/write is performed, depending upon whether the process is in the final or intermediate phase, respectively. Synchronization of the read and write operation during the intermediate merge phase significantly reduces interference or conflict because the seek time for the next desired read overlaps another I/O to a larger extent than is otherwise possible. Another advantage of synchronization is the fact that only one device is used for the read/write couple which results in a higher probability of selecting a next input device with small interference. It should be borne in mind that the above discussion is made with reference to the channel associated with the next input block and that this rotation is made possible because the input and output buffers of a channel that are performing I/O are filled and emptied, respectively, in one operation as a result of the unique contiguous read/write processes of this invention.

Yet another important feature of the process of reading data from the random access storage devices into the designated input buffer is to anticipate the precise order that each string being merged will require its next block of data. This is important since typically all of the blocks of the strings being merged cannot be simultaneously stored in the record hold area, and, accordingly, the blocks of each of the strings being merged must be read sequentially into core memory. The manner in which the next block required is determined may best be illustrated by referencing FIG. 10 of the drawings. FIG. 10 shows a series of three strings which are to be merged in a computer with a record hold area capable of storing four blocks each containing four records. Assuming that the merge order is three, and assuming that the records are ordered from lowest key value to highest, it can be seen from the record values that block I of string I will exhaust first since its highest record value is 40 which is lower than each of the highest record values for the other blocks. Block I of string III will exhaust next, block II of string I will exhaust next, and finally, block I of string II will exhaust last. Thus, string III will require a new block of records before either of the other strings.

While string III will need a new block of data before either of strings I & II, it is not necessarily true that the most desirable block to be read will be block II of string III. It can be seen from the figure that three full blocks of data will be merged and delivered to the output (or write buffer if this was a final merge) before block I of string III is exhausted. These merge blocks will contain the following records:

12, 18, 19, 22; 36, 37, 38, 39; 40, 41, 43, 43

Thus, a maximum of three input/output cycles can be processed before a new block of data for string III is required. As will be seen, the reading of new blocks before the next block of string III is required, increases computer efficiency since it allows a more continuous use of available computer resources.

An important feature of this invention is that once enough data is merged to form a block, the random access buffers are rotated and commands will be issued to read and write a new block of information. By ensuring that the record hold area will be well filled with new data records, more freedom is given to the selection, since more "advanced" records will be in memory. Thus, as the merge proceeds, the operation of the computer is optimized with respect to time thereby increasing computer efficiency. The read step and the aforementioned process of anticipating the next blocks to be read are accomplished by proper entries in the random access tables which are established by routine 104 of the post-string generation phase; among these is a table containing a sequential list of read commands. The first command on the list is that being currently executed, the next command is that which will be executed during the next read and so on. After each command is executed, it is stored in the backward table and the future table is updated by eliminating the previously executed command and generating a new command which will be stored last in the table. The new command is determined by evaluating the first blocks in the new associative list position table according to a set of values. A scale of priorities is established as follows against which each block in memory is evaluated:

(1) The first block to be exhausted is the only block in memory for that particular string.
(2) The block belongs to a hyperactive string.
(3) The block belongs to a very active string.
(4) The number of blocks of the candidate block's string already on the future list (from low to high).
(5) Channel conflict the candidate block causes on the command list.
(6) The device conflict the candidate block would cause on the command list.

(7) The cylinder in this track conflict the candidate block would cause on the command list.

For example, if a next needed block is stored on the same device as the block whose read command immediately precedes it in the list, a major conflict would exist and another candidate block would likely be chosen. In order to clearly illustrate this feature of the invention, it will be assumed that a read command for block II of string III would create a major conflict.

Referring now to FIG. 11, there is depicted the status in central memory of the record hold area, the working buffer, the input buffer, and the output buffer as the process of merging the strings of FIG. 10 goes through a cycle of merge and I/O operations. Figures in a box □ indicates a candidate record of a string, and spaces filled with an asterisk (*) indicate that that memory space is not available to the sort process. FIG. 11 (a) shows the status at the beginning of the cycle. String I has its first two blocks of data, string II has its first block of data, and string III has its first block of data in the record hold area. The record key values in the squares are the values of the candidate records in their respective strings and the arrows indicate that each record of a string points to the next succeeding record in that string. The working buffer contains block II of string II, and the read buffer contains block III of string II, because of the aforementioned major conflict with regard to block II of string III, which ordinarily would have appeared in one of these two buffers. The output buffer contains the winning records of the merge cycle that preceded. FIG. 11 (b) shows the status in central memory at an intermediate stage of the process. The records whose key values were 12 and 18 respectively were the winning records of the selection process to this point and they have been exchanged with records 63 and 68 in the working buffer. FIG. 11 (c) shows the status in central memory just prior to the buffer rotation process that was described above in connection with FIG. 10, since the working buffer contains a full block of winning records. At this point, a rotation will be executed and a read/write operation will be performed. The output buffer will be emptied and the next block on the command list will be brought in. FIG. 11 (d) shows the status of the random access buffers at the end of these operations and just prior to a new merge cycle. It should be noted that the foregoing example illustrates an extremely simple case where only one channel was available to the sort process. It is obvious that if there were more channels, the buffer rotations would have been performed with a selected channel buffer thus allowing other channels to be kept active.

Having pointed out some of the important features of the invention which are utilized herein, reference is now made to FIG. 12, which is a block diagram of the initial and final merger phase of the method of this invention. A composite diagram is used to illustrate the operations of these phases because the operations are essentially identical with the exception that the initial merge phase may comprise a number of merge passes and its output is stored in random access storage under control of the sort, whereas the final merge phase consists of a single merge pass and its output is directed to the normal output channel of the data processor. Rotation in the final merge phase does not include the output buffer. Routine 110 performs the usual initialization functions for these phases. Routine 111 then reads the first I/O transfer units of each string to be merged into the record hold area and reads the next needed I/O transfer unit or units into the working buffer and input buffers in accordance with the procedures determined by the post string generation phase described above. Next, routine 112 updates all of the data transfer tables so that the read/write operations heretofore described may be performed. The merge process is now ready to begin and control is passed to the selection routine 113 which chooses a winning record from among the candidate records by a known method such as the quadratic selection technique. Routine 114 then tests to determine if the winning record is a normal record or a flush record indicating the end of a string being merged. Routine 114 also tests to determine if a string is exhausted and yet has other blocks to be merged which are not in the record hold area. If such is the case, then routine 128 forces the string's next block in which may require the writing of an existing block in the record hold area into random access memory. If it is a normal record, routine 115 tests to determine if the working buffer is full; if it is, the record is held and control is transferred to routine 116. Routine 116 tests to determine if all the transfer blocks are full. This test is necessary because as was described hereinabove, an I/O transfer unit may contain more than a single block of the size determined in the pre-string generation phase, and because when such is the case, the integrity of the block must be maintained. If all blocks are not full, then routine 117 sets the necessary header information for a new block and the process continues. Routine 118 performs the record exchange between the working buffer and the record hold area as was described above in the discussion of FIGS. 10 and 11 and transfers control to the selection routine to continue the merge. Returning now to routine 116, if all blocks are full, control is transferred to routine 121, which prepares the buffers for rotation. In the initial merge phase the working buffer is given proper header information for an output buffer, and in the final merge phase an indication is made that the buffer space will be available for input. Routine 122 does the updating necessary for the channel whose block is completed. Such updating includes updating the tables mentioned previously which are used for block control. Next, routine 123 performs the buffer rotation described hereinabove. At this point, routine 124 evaluates the candidate I/O transfer units on the basis of the priority scale discussed in connection with FIGS. 9 and 10 and updates the data transfer tables to indicate the choice and performs seeks to devices if no prior conflict exists in the transfer table. Routine 125 then executes the input/output functions that were at the front of the queues in the data transfer tables. Next, routine 126 queues the position command (device seek) for the next input/output function queued in the data transfer table for the device just activated by an I/O. Routine 127 tests to determine if the string flag was set by routine 120, if it was not as is the case when routine 121 is entered from routine 116, control is returned to routine 117 and the process continues using the new working buffer. Returning now to routine 114, if the record was not a normal record, control is transferred to routine 119, which tests to determine if this is the last string to be merged by this phase. If it is, a normal return is made and if this is the initial merge phase, the final merge phase is entered. If it is the final merge phase, the sort is completed. If this is not the last string to be merged, which would only occur if this is the initial merge phase, then routine 120 sets a flag that indicates to routine 127 that control should be transferred to routine 111, which will begin the merge process on the next set of strings to be merged.

FINAL MERGE PHASE

The final merge phase is essentially the same as the initial merge phase, as was pointed out hereinabove, except that only one pass of the merge process is required to complete the execution of this phase, and the output of the merge process is written into the normal input/output storage devices of the data processors.

Each of the aforementioned routines in the various phases of the sort process of this invention were described in general terms to indicate their function and the bounds within which they operate. They were not discussed in detail since the development of these routines would be obvious to one skilled in the data processing technology in view of the foregoing detailed description of the invention. To include such a detailed description of each routine would tend to obscure the inventive subject matter resulting in a lack of clarity and conciseness required for understanding the concepts taught by this invention.

The sorting method of this invention was compared with the IBM SM-023 sort/merge program to determine the respective throughput execution times of the two methods under similar data input and computing equipment conditions. The comparison was executed using an IBM 360/65 electronic data processor with the data record size set at 192 characters, the input/output block size set at 37 records/block with the working device being a 2314 spindle. The following are the results of the comparison:

| Input Device | No. of Devices | Memory Allocated | Channels Used | Sort Size | IBM Method | Whitlow et al Method |
|---|---|---|---|---|---|---|
| 180KC | 4 | 102K | 1 | $1 \times 10^6$ | 18 | 9 |
| 180KC | 4 | 102K | 1 | $2 \times 10^6$ | 36 | 18 |
| 180KC | 4 | 102K | 1 | $10 \times 10^6$ | 340 | 255 |
| 320KC | 6 | 200K | 2 | $60 \times 10^6$ | 2200 | 800 |

It therefore can be seen that the method of this invention provides a substantial reduction of sort execution time over the IBM method which method is commonly used today.

While the invention has been described in connection with a preferred embodiment, it should be understood that it is intended to cover such alternatives, modifications, and equivalents as may be included within the spirit and scope of the invention as defined by the appended claims.

We claim:

1. The new use of a general purpose electronic data processor having a central processing unit with a working storage area, at least one random access storage device and at least one input/output means, the new use comprising a method of ordering data comprising the steps of:
generating strings of sequentially ordered data, said strings being stored in sets of data ordered blocks,
dynamically detecting the bias of said data,
reversing the ordered sequence of string generation when a significant negative bias is detected,
calculating an optimum sequence for merging said generated strings, said sequence minimizing the number of times said data is merged,
anticipating the order in which new transfer units of data will be required for merging, said transfer units comprising at least one data block,
initially merging said generated strings according to said calculated string merge sequence to form a set of merged strings,
finally merging said set of merged strings to form a single string of ordered data, and
synchronizing the read/write operations during said merging steps.

2. The method of claim 1 further comprising the steps of:
coupling a read of a transfer unit of unmerged ordered data with a write of a transfer unit of merged data, access time thereby being reduced.

3. The method of claim 2 further comprising the step of reading a transfer unit of unmerged ordered data from the same fundamental storage unit of random access storage into which transfer unit of merged data is being written.

4. The method of claim 2 further comprising the steps of:
optimizing with respect to a specified parameter the size of said data blocks, said parameter being one of the following: throughput time, input/output time, number of system calls, and CPU time, and
optimizing with respect to time the size of said transfer unit.

5. The method of claim 4 further comprising the steps of:
distributing successive transfer units generated during said string generation step sequentially over the channels of said data processor and then sequentially over said random access devices associated with said channels.

6. The method of claim 5 further comprising the step of:
establishing empty storage spaces in said random access memory between said data transfer units, said spaces permitting either a write operation to occur immediately after a read operation or a read operation to occur immediately after a write operation thereby reducing the latency time of said read/write operation.

7. The method of claim 6 further comprising the steps of:
establishing one of shared and individual channel buffers in computer memory for each channel assigned to random access devices, said channel buffers including an output buffer during said string generation step, input and output buffers during said initial merging step and input buffers during said final merge step, and
establishing a working buffer in computer memory, said buffer being capable of being functionally exchanged with said channel buffers whereby said working buffer accepts records during said string generation step, accepts and delivers records during said initial merging step and delivers records during said final merging step.

8. The method of claim 7 further comprising the steps of:
maintaining a record hold area in computer memory for said merging steps from which data is merged and into which unmerged records are read, said records being read into said record hold area in any desired sequence, and linking said records in said record hold area thereby maintaining the sequential order of said records in their associated string.

9. The method of claim 8 further comprising the step of:
exchanging input records from said working buffer with merged records from said record hold area as merged records are generated thereby substantially improving the utilization of the memory space in said working buffer.

10. The new use of a general purpose electronic data processor having a central processing unit with a working storage area, at least one random access storage device and at least one input/output means, the new use comprising a method of ordering data including the steps of:
generating strings of sequentially ordered data, said strings being stored in sets of data ordered blocks,
detecting the bias of said data during said string generation step,
reversing the sequence of string generation for succeeding strings to be generated when a significant negative bias is detected relative to the generated string, and
merging said strings of data to form a single string of ordered data.

11. The method of claim 10 wherein said bias detecting step comprises the steps of:
predicting the average string size of said data,
comparing the size of said generated strings with said predicted size, a negative bias existing when the size of said generated string is less than predicted size,
determining if said bias is significant, and
storing a reverse string generation sequence command for future strings when said negative bias is detected.

12. The method of claim 11 wherein said predicting step further comprises the steps of:
predicting the average string size of random data, and said determining step comprises the step of:
comparing said generated string size with a string size being a selected fraction of said predicted string size.

13. The new use of a general purpose electronic data processor having a central processing unit with a working storage area, at least one random access storage device and at least one input/output means, the new use comprising a method of ordering data including the steps of:
generating strings of sequentially ordered data,
storing the data in each of said generated strings in sets of data ordered blocks in random access storage,
generating header information in each block for linking each of said blocks to at least one preceding and at least one succeeding data block in its associated string, and
merging said strings of data to form a single string of ordered data.

14. The method of claim 13 further comprising the step of:
providing information for each string for defining the sequence in which its associated data was formed into a string in said string generation step.

15. The method of claim 14 further comprising the steps of:
writing data to and reading data from random access working storage in transfer units, said transfer units comprising at least one of said data blocks.

16. The new use of a general purpose electronic data processor having a central processing unit with a working storage area, at least one random access storage device and at least one input/output means, the new use comprising a method of ordering data including the steps of:
generating strings of sequentially ordered data, said strings being stored in sets of data ordered blocks,
initially merging said strings of data to form a set of strings,
finally merging said strings of data to form a single string of ordered data, and
reducing the input/output transfer time during said merging steps by:
reading at least one transfer unit of each of a selected number of strings from random access storage into the buffers of said data processing system, said transfer units each comprising at least one of said data blocks,
anticipating the order in which said read data transfer units will be exhausted by merging, and
utilizing said anticipated order as a discriminator in selecting the next input transfer unit.

17. The method of claim 16 further comprising the steps of:
determining the degree of conflict of at least one of the conflicts due to conflicting channel use, conflicting device use, and conflicting use of read/write heads in a device, and
utilizing said determined degree of conflict as a second discriminator in evaluating the next input/output transfer unit.

18. The new use of a general purpose electronic data processor having a central processing unit with a working storage area, at least one random access storage device, and at least one input/output means, the new use comprising a method of ordering data comprising the steps of:
generating strings of sequentially ordered data, said strings being stored in sets of data ordered blocks,
initially merging said strings to form a set of strings,
finally merging said strings of data to form a single string of ordered data,
optimizing the size of each of said data blocks with respect to a parameter which is one of: throughput time, I.O. time, number of system calls, and CPU time, and
optimizing the size of said transfer units with respect to a parameter which is one of: throughput time, I.O. time, number of system calls, and CPU time, said optimizing of said block size occurring before said string generation step and said optimization of said transfer unit size occurring before said string generation step and before said initial merge step.

19. The method of claim 18 wherein said optimizing steps comprise the steps of:
simulating a number of different transfer unit and block sizes,
calculating sort execution times for each simulated transfer unit and block size, and selecting the transfer unit and block size with respect to a parameter which is one of: throughput time, I.O. time, number of system calls, and CPU time, thereby resulting in a minimum sort.

20. The new use of a general purpose electronic data processor having a central processing unit with a working storage area, at least one random access storage device and at least one input/output means, the new use comprising a method of ordering data comprising the steps of:
 generating strings of sequentially ordered data, said strings being stored in sets of data ordered blocks,
 calculating an optimum sequence for merging said generated strings, said sequence minimizing the quantity of data transferred,
 initially merging said strings of data to form a set of strings of ordered data, and
 finally merging said merged strings of data to form a single string of ordered data, said merging steps being executed according to said calculated sequence.

21. The method of claim 20 wherein said calculating and initial merging steps comprise the steps of:
 calculating the existence and order of a partial order of merge for the first level of said initial merging phase, said partial order of merge being a set of strings less than the set of strings merged by the maximum order of merge in said initial merging phase,
 merging said partial set of strings, and
 merging the remaining strings according to the maximum order of merge in said initial merging phase, until a set of strings is derived equal in number to the maximum order of merge of said final merge phase.

22. The method of claim 21 further comprising the steps of:
 creating a first table, said first table indicating the number and composition of strings existing before each merge pass,
 indicating on a second table at each merge pass which strings or sets of strings are merged an even number of times and which are merged an odd number of times,
 merging backward those strings indicated to be merged an odd number of times, and
 merging forward those strings indicated to be merged an even number of times.

23. The method of claim 22 wherein said indicating step includes the step of:
 comparing the strings in the nth merge level of said second table with the strings of the n−1 merge level of said first table,
 determining if the strings of the nth merge level were derived by a merge from the n−1 merge level, and
 reversing the odd-even indicator of the n−1 merge level of said second table if the strings of said nth merge were derived by a merge from said n−1 merge level.

24. In a method of ordering data in a general purpose electronic data processor having a central processing unit with a working storage area, at least one random access storage device, and at least one input-output means, said method comprising the steps of:
 generating strings of sequentially ordered data, said strings being stored in sets of data blocks, and
 merging said strings of data,
 the new use of said random access storage device comprising the step of coupling a read of at least one data block of unmerged ordered data with a write of at least one data block of merged data, access time thereby being reduced.

25. In a method of ordering data in a general purpose electronic data processor having a central processing unit with a working storage area, at least one random access storage device, and at least one input-output means, said method comprising the steps of:
 generating strings of sequentially ordered data, said strings being stored in sets of data blocks, and
 merging said strings of data,
 a new use of buffers during non-final merging steps comprising the steps of
 establishing input, output and working buffers in computer memory said buffers being functionally exchanged whereby the input buffer, upon being filled with records to be merged, becomes the working buffer, the working buffer, upon being filled with merged records, becomes the output buffer, and the output buffer, upon being emptied of merged records, becomes the input buffer.

26. In a method of ordering data in a general purpose electronic data processor having a central processing unit and a working storage area, at least one random access storage device, and at least one input-output means, said method comprising the steps of:
 generating strings of sequentially ordered data, said strings being stored in sets of data blocks, and
 merging said strings of data,
 a new use of a working buffer in computer memory comprising the steps of exchanging unmerged records in said working buffer with merged records from a record hold area in computer memory, thereby substantially improving the utilization of memory space in said working buffer.

27. In a method of ordering data in a general purpose electronic data processor having a central processing unit with a working storage area, at least two channels each having at least two random access storage devices associated there with and at least one input-output means, said method comprising the steps of:
 generating strings of sequentially ordered data said strings being stored in sets of data blocks, and
 merging said strings of data,
 a new use of said channels and said random access storage devices comprising the steps of distributing successive transfer units generated during said string generation step sequentially over the channels of said data processor and then sequentially over said random access devices associated with said channels.

28. The new use of a general purpose electronic data processor having a central processing unit with a working storage area, at least one random access storage device, and at least one input/output means, the new use comprising a method of ordering data including the steps of:
 generating strings of sequentially ordered data, said strings stored in sets of data ordered blocks,
 merging said strings of data to form a single string of ordered data, and
 during the execution of said merging step, in anticipation of the order in which data blocks are to be read, positioning an input/output means over an area in a random access storage device containing the blocks to be read before said blocks are required for merging.

29. In a method of ordering data in a general purpose electronic data processor having a central processing unit with a working storage area, at least one random access storage device, and at least one input-output means, said method comprising the steps of:

generating strings of sequentially ordered data, said strings being stored in sets of data blocks, and merging said strings of data, the new use of said random access storage device comprising the step of anticipating the order in which data blocks are to be read and positioning an input-output means over a portion of a random access storage device prior to the need to read data from said portion, access time thereby being reduced.

30. In a general purpose electronic data processor having a central processing unit with working storage, at least one random access storage device having fundamental storage units, and at least one input-output means, the method of controlling said data processor for ordering data signals including the steps of:

(a) directing said central processing unit for generating short strings of sequentially ordered data signals, and directing said random access storage device for write operation to store in fundamental storage units thereof said short strings as ordered blocks of data signals, (b) directing said random access storage device for read operation to transfer units of said short strings of ordered data signals from a certain fundamental storage unit of said random access storage to said working storage, (c) directing said central processing unit for merging transferred units of said short strings of data signals to form a longer merged string of ordered data signals, and (d) during the execution of said merging step, coupling a read operation of said random access device on a transfer unit of a short string of ordered data signals with a write operation of a transfer unit of a longer merged string of data signals, said read and write operations being directed to the same fundamental storage unit of said random access storage device, the access times being thereby reduced.

31. The method of claim 30 further comprising the step of:

directing the operation of said random access storage device to establish empty storage spaces in said random access storage device between stored ones of said data transfer units, and directing the performance of said read operation and said write operation with one of said operations to occur immediately after the other thereof, and with the write operation to be at one of said empty storage spaces and the read operation to be of the stored data transfer unit at the adjacent storage space, thereby reducing the latency time in said read and write operations.

32. The method of claim 30 further comprising the step of:

directing said random access storage device to perform said write operation in the storage space thereof emptied by an immediately preceding read operation.

33. In a general purpose electronic data processor having a central processing unit with working storage, at least one random access storage device, and at least one input-output means, the method of controlling said data processor for ordering data signals including the steps of:

(a) directing said central processing unit for generating short strings of sequentially ordered data signals, and directing said random access storage device for write operation to store short strings as ordered blocks of data signals, (b) directing said random access storage device for read operation to transfer units of said short strings of ordered data signals from said random access storage to said working storage, (c) directing said central processing unit for merging transferred units of said short strings of data signals to form a longer merged string of ordered data signals, and (d) during the execution of said merging step, directing said random access storage device for a read operation from a certain portion thereof to transfer at least one block of a short string of ordered data signals of said merging step and for a write operation into the same storage device portion at least one data block of said longer merged string of data signals.

34. The method of claim 33 and further comprising the step of:

directing said random access storage device to perform said write operation in the storage space thereof emptied by an immediately preceding read operation.

35. In a general purpose electronic data processor having a central processing unit with working storage, at least one random access storage device, and at least one input-output means, the method of controlling said data processor for ordering data signals including the steps of:

(a) directing said central processing unit for generating short strings of sequentially ordered data signals, and directing said random access storage device for write operation to store said short strings as ordered blocks of data signals, (b) directing said random access storage device for read operation to transfer units of said short strings of ordered data signals from said random access storage to said working storage, (c) directing said central processing unit for merging transferred units of said short strings of data signals to form a longer merged string of ordered data signals, and directing said random access storage for write operation to store said longer merged string as ordered blocks of data signals, and (d) directing the operation of said random access storage device to establish empty storage spaces in said random access storage device between stored ones of said data transfer units, and to perform said read operation of said short string units and said write operation of said longer string units with one of said operations to occur immediately after the other thereof, and with the write operation to be at one of said empty storage spaces and the read operation to be of the stored data transfer unit at the adjacent storage space, thereby reducing the latency time in said read and write operations.

* * * * *